US010938963B2

(12) United States Patent
Joo et al.

(10) Patent No.: US 10,938,963 B2
(45) Date of Patent: Mar. 2, 2021

(54) ELECTRONIC DEVICE FOR PERFORMING COMMUNICATION WITH EXTERNAL ELECTRONIC DEVICE

(71) Applicant: Samsung Electronics Co., Ltd., Gyeonggi-do (KR)

(72) Inventors: Jong-Sung Joo, Seoul (KR); Seung-Cheol Lee, Gyeonggi-do (KR); Je-Hyun Lee, Seoul (KR); Ki-Ho Cho, Gyeonggi-do (KR); Hyoung-Tak Cho, Gyeonggi-do (KR); A-Reum Choi, Gyeonggi-do (KR); In-Young Choi, Seoul (KR); Dong-Il Son, Gyeonggi-do (KR); Pil-Joo Yoon, Gyeonggi-do (KR); Sun-Min Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 40 days.

(21) Appl. No.: 16/035,002

(22) Filed: Jul. 13, 2018

(65) Prior Publication Data
US 2019/0020735 A1 Jan. 17, 2019

(30) Foreign Application Priority Data

Jul. 13, 2017 (KR) ........................ 10-2017-0089192

(51) Int. Cl.
*H04L 29/06* (2006.01)
*H04W 4/40* (2018.01)
(Continued)

(52) U.S. Cl.
CPC .......... *H04L 69/08* (2013.01); *G06K 9/00664* (2013.01); *H04H 20/55* (2013.01);
(Continued)

(58) Field of Classification Search
CPC ......... H04L 69/08; H04L 69/18; H04L 69/24; H04L 67/12; G06K 9/00798;
(Continued)

(56) References Cited

U.S. PATENT DOCUMENTS 7,818,380 B2 * 10/2010 Tamura ................. H04L 67/125
709/206
8,856,349 B2 * 10/2014 Jain ........................ H04L 69/24
709/227
(Continued)

FOREIGN PATENT DOCUMENTS

KR    10-2011-0071494    6/2011
KR    10-2013-0114404    10/2013

OTHER PUBLICATIONS

Sprouffske S. V2X Cooperative Systems: What is it all about?. InITS America 23rd Annual Meeting & Exposition Apr. 2013 (pp. 21-24). (Year: 2013).*

(Continued)

*Primary Examiner* — John A Follansbee
*Assistant Examiner* — James N Fiorillo
(74) *Attorney, Agent, or Firm* — The Farrell Law Firm, P.C.

(57) ABSTRACT

An electronic device includes at least one communication circuit, and a processor electrically connected with the at least one communication circuit. The processor may be configured to select an external electronic device in response to a user input, broadcast, through the at least one communication circuit using a first protocol, a connection request for a second protocol-based communication with the external electronic device, receive a response to the connection request from the external electronic device through the at least one communication circuit, and perform communication with the external electronic device through the at least one communication circuit using a second protocol, based (Continued)

on connection information about the external electronic device for the second protocol-based communication, the connection information being contained in the response.

16 Claims, 16 Drawing Sheets

(51) Int. Cl.
| | |
|---|---|
| *G06K 9/00* | (2006.01) |
| *H04H 20/65* | (2008.01) |
| *H04W 4/46* | (2018.01) |
| *H04W 4/06* | (2009.01) |
| *H04H 20/72* | (2008.01) |
| *H04W 4/44* | (2018.01) |
| *H04H 20/55* | (2008.01) |
| *G01C 21/36* | (2006.01) |
| *H04L 29/08* | (2006.01) |
| *H04H 20/62* | (2008.01) |

(52) U.S. Cl.
CPC .......... *H04H 20/65* (2013.01); *H04H 20/72* (2013.01); *H04L 69/18* (2013.01); *H04L 69/24* (2013.01); *H04W 4/06* (2013.01); *H04W 4/40* (2018.02); *H04W 4/44* (2018.02); *H04W 4/46* (2018.02); *G01C 21/3661* (2013.01); *H04H 20/62* (2013.01); *H04L 67/12* (2013.01)

(58) Field of Classification Search
CPC .......... G06K 9/00664; G08G 1/09671; G08G 1/09675; H04W 4/40; H04W 4/06; H04W 4/44; H04W 4/46; H04W 76/10; H04W 76/14; H04W 8/005; H04W 48/10; H04H 20/65; H04H 20/55; H04H 20/62; H04H 20/72; G01C 21/3661
USPC .................................................. 709/230, 229
See application file for complete search history.

(56) References Cited

U.S. PATENT DOCUMENTS

| | | | | |
|---|---|---|---|---|
| 10,299,088 | B2* | 5/2019 | Uchiyama | G08G 1/005 |
| 2007/0005206 | A1* | 1/2007 | Zhang | G06F 3/16 |
| | | | | 701/36 |
| 2010/0063889 | A1* | 3/2010 | Proctor, Jr. | G06Q 20/3224 |
| | | | | 705/21 |
| 2010/0177749 | A1* | 7/2010 | Essinger | H04L 69/08 |
| | | | | 370/338 |
| 2010/0235518 | A1* | 9/2010 | Holden | G06F 13/385 |
| | | | | 709/227 |
| 2010/0250106 | A1* | 9/2010 | Bai | G08G 1/161 |
| | | | | 701/117 |
| 2014/0309806 | A1* | 10/2014 | Ricci | G06Q 10/02 |
| | | | | 701/1 |
| 2014/0309870 | A1* | 10/2014 | Ricci | G06F 3/017 |
| | | | | 701/36 |
| 2016/0360382 | A1* | 12/2016 | Gross | G06F 3/04883 |
| 2017/0123628 | A1* | 5/2017 | Lin | G06F 3/04842 |
| 2017/0289098 | A1* | 10/2017 | Chun | H04L 61/103 |
| 2018/0059669 | A1* | 3/2018 | Madigan | H04W 4/024 |
| 2018/0077668 | A1* | 3/2018 | Chun | H04W 76/23 |
| 2018/0101736 | A1* | 4/2018 | Han | G06T 11/60 |
| 2018/0147988 | A1* | 5/2018 | Lee | G01C 21/3685 |
| 2018/0184270 | A1* | 6/2018 | Chun | H04W 24/08 |
| 2018/0191551 | A1* | 7/2018 | Chun | H04L 67/12 |
| 2018/0192266 | A1* | 7/2018 | Park | H04W 4/80 |
| 2018/0234496 | A1* | 8/2018 | Ratias | G06F 16/27 |
| 2018/0324571 | A1* | 11/2018 | Buckley | H04W 12/10 |
| 2018/0324694 | A1* | 11/2018 | Uchiyama | H04W 4/70 |
| 2018/0352583 | A1* | 12/2018 | Smith | H04W 76/34 |
| 2018/0370365 | A1* | 12/2018 | Lee | B60K 35/00 |
| 2019/0012912 | A1* | 1/2019 | Kim | G08G 1/096716 |
| 2019/0018419 | A1* | 1/2019 | Lee | G08G 1/096791 |
| 2019/0045034 | A1* | 2/2019 | Alam | H04L 67/30 |
| 2019/0082414 | A1* | 3/2019 | Lei | H04W 4/029 |
| 2019/0110175 | A1* | 4/2019 | Chun | H04W 80/08 |
| 2019/0137595 | A1* | 5/2019 | Choi | G05D 1/0088 |
| 2019/0279509 | A1* | 9/2019 | Kamini | H04W 4/44 |

OTHER PUBLICATIONS

Nadeem T, Dashtinezhad S, Liao C, Iftode L. TrafficView: traffic data dissemination using car-to-car communication. ACM Sigmobile Mobile Computing and Communications Review. Jul. 1, 2004;8(3):6-19. (Year: 2004).*

Sprouffske S. V2X Cooperative Systems: What is it all about?. InITS America 23rd Annual Meeting & Exposition Apr. 2013 (pp. 21-24). (Year: 2013) (Year: 2013).*

* cited by examiner

ELECTRONIC DEVICE FOR PERFORMING COMMUNICATION WITH EXTERNAL ELECTRONIC DEVICE

CROSS-REFERENCE TO RELATED APPLICATION(S)

This application is based on and claims priority under 35 U.S.C. § 119 to Korean Patent Application No. 10-2017-0089192, filed on Jul. 13, 2017, in the Korean Intellectual Property Office, the disclosure of which is incorporated herein by reference in its entirety.

BACKGROUND

1. Field

The present disclosure relates generally to an electronic device for performing communication with an external electronic device.

2. Description of Related Art

Vehicle-to-everything (V2X) refers to all types of communication schemes applicable to vehicles, which encompass vehicle-to-vehicle (V2V) communication, vehicle-to-infrastructure (V2I) communication, vehicle-to-network (V2N) communication, and vehicle-to-pedestrian (V2P) communication.

V2X communication is developing, and aimed at improving safe driving, improving convenience and driving efficiency, and providing various entertainment experiences. Institute of Electrical and Electronics Engineers (IEEE) 802.11p is among communication standards supporting V2X communication, and it is becoming a worldwide trend for it to be mandatory to support V2X communication in new cars.

Generally, V2X-supported automobiles, or V2X-equipped electronic devices, may communicate with other cars or external electronic devices via communication schemes that broadcast messages (e.g., basic safety messages (BSMs)) in accordance with a V2X-related standard. However, unnecessary messages may also be delivered to other external electronic devices, causing a waste of resources.

Accordingly, there is a need for an improvement measure for effectively communicating with external electronic devices using V2X communication schemes.

SUMMARY

The present disclosure is provided to address at least the above-mentioned problems and/or disadvantages and to provide at least the advantages described below.

In accordance with an aspect of the present disclosure, an electronic device is provided, which includes at least one communication circuit and a processor electrically connected with the at least one communication circuit. The processor may be configured to select an external electronic device in response to a user input, broadcast, through the at least one communication circuit using a first protocol, a connection request for a second protocol-based communication with the external electronic device, receive a response to the connection request from the external electronic device through the at least one communication circuit, and perform communication with the external electronic device through the at least one communication circuit using a second protocol, based on connection information about the external electronic device for the second protocol-based communication, the connection information being contained in the response.

In accordance with another aspect of the present disclosure, an electronic device is provided, which includes at least one communication circuit and a processor electrically connected with the at least one communication circuit. The processor may be configured to select an external electronic device for performing communication in accordance with a user input, broadcast, through the at least one communication circuit, through a first channel, a connection request containing information about a second channel for communication with the external electronic device and identification information corresponding to the external electronic device, receive a response to the connection request from the external electronic device through the at least one communication circuit, and perform the communication with the external electronic device through the at least one communication circuit using the second channel, based on connection information about the external electronic device, the connection information being contained in the response.

In accordance with another aspect of the present disclosure, an electronic device is provided, which includes at least one communication circuit and a processor electrically connected with the at least one communication circuit. The processor may be configured to select at least one external electronic device in accordance with a first input from a user, select at least one driving-related message in accordance with a second input from the user from among a plurality of designated driving-related messages, and broadcast, through the at least one communication circuit, a message containing identification information about the at least one selected external electronic device and the at least one selected driving-related message.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Various embodiments of the present disclosure are described with reference to the accompanying drawings.

Figure 1:
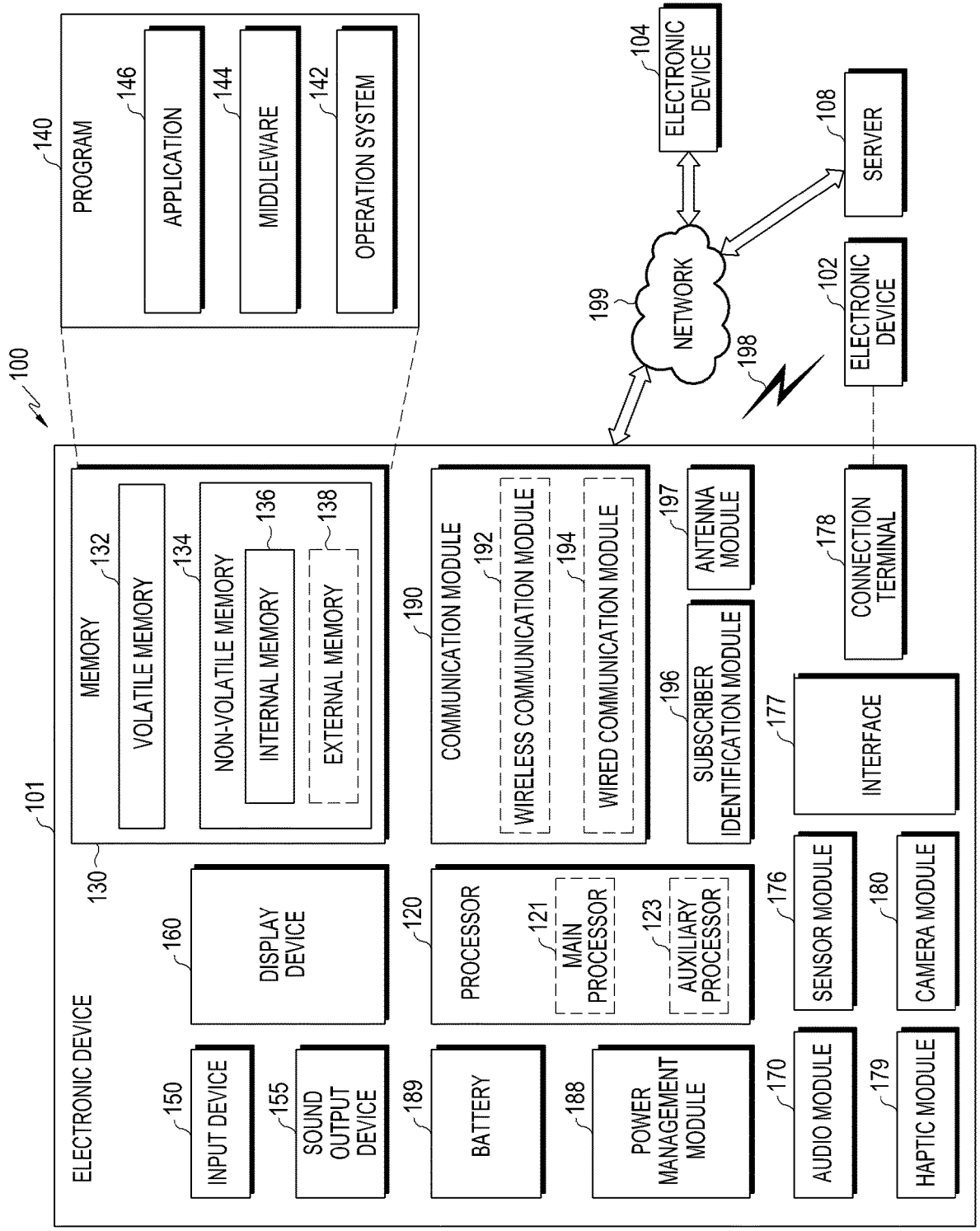
FIG. 1 is a block diagram illustrating an electronic device in a network environment, according to an embodiment.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may drive, for example, software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, for example, an operating system (OS) 142, middleware 144, or an application 146.

The input device 150 may be a device for receiving a command or data, which is to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing records, and the receiver may be used for incoming calls. According to an embodiment, the receiver may be implemented separately from, or as a part of the speaker.

The display 160 may visually provide information to a user of the electronic device 101. The display device 160 may include, e.g., a display, a hologram device, or a projector and a control circuit for controlling the display, hologram device, or projector. The display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150, or output a sound through the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) or of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support one or more specified protocols enabling a wired or wireless connection with an external electronic device (e.g., the electronic device 102). The interface 177 may include, for example, a high definition multimedia interface (HDMI), a universal serial bus (USB) interface, a secure digital (SD) card interface, or an audio interface.

A connecting terminal 178 may include a connector, for example, an HDMI connector, a USB connector, an SD card connector, or an audio connector (e.g., a headphone connector), able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may manage power supplied to the electronic device 101. The power management module 188 may be configured as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) or wireless communication channel between the electronic device 101 and an external electronic device (e.g., the electronic device 102, the electronic device 104, or the server 108) and performing communication through the established communication channel. The communication module 190 may include one or more CPs that are operated independently from the processor 120 (e.g., an AP) and supports wired or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information (e.g., international mobile subscriber identity (IMSI)) stored in the subscriber identification module (SIM) 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme used in the communication network.

Some of the above-described components may be connected together through an inter-peripheral communication scheme (e.g., a bus, a general purpose input/output (GPIO), a serial peripheral interface (SPI), or a mobile industry processor interface (MIPI)), communicating signals (e.g., commands or data) therebetween.

Commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed on the electronic device 101 may be run on one or more other external electronic devices 102, 104, or 108. For example, if the electronic device 101 should perform a function or a service automatically, or in response to a request from a user or another device, the electronic device 101, instead of, or in addition to, executing the function or service on its own, may request an external electronic device to perform at least some functions associated therewith.

The external electronic device (e.g., electronic devices 102 and 104 or server 106) may execute the requested functions or additional functions and transfer an execution result of to the electronic device 101. The electronic device 101 may provide a requested function or service by processing the received result as it is or in addition to other processes. To that end, a cloud computing, distributed computing, or client-server computing technique may be used, for example.

The communication module 190 may support various protocols for wireless communication. For example, the communication module 190 may support protocols (e.g., wireless access in vehicular environment (WAVE)) related to V2X-related standards (e.g., WAVE short message protocol (WSMP)). Further, the communication module 190 may support various protocols (e.g., transfer control protocol/Internet protocol (TCP/IP) or user datagram protocol (UDP)) available for communication with external electronic devices via the first network 198 or the second network 199.

According to an embodiment, the processor 120 may broadcast messages (e.g., basic safety messages (BSMs)) through the communication module 190 using a first protocol. The first protocol may be a protocol associated with a V2X-related standard, and the messages may be messages (e.g., BSMs) based on the V2X-related standard. The processor 120 may broadcast the messages to V2X-supported external electronic devices (e.g., automobiles, smartphones, or tablet PCs) within a designated distance using the first protocol.

The processor 120 may receive, through the communication module 190, a plurality of messages broadcast using the first protocol from the V2X-supported external electronic devices. The plurality of external electronic devices may broadcast V2X-related standard-based messages (e.g., BSMs) using the first protocol.

The processor 120 may select at least one external electronic device for communication in accordance with a user input. For ease of description, the following example focuses on one in which one external electronic device is selected, however embodiments of the present disclosure are not limited thereto, and a plurality of external electronic devices may be selected.

For example, for communication with the selected external electronic device, the processor 120 may change protocols or may change channels for communication without changing protocols. Additionally or alternatively, the processor 120 may both change protocols and change channels for communication with the selected external electronic device.

For example, the processor 120 may select an external electronic device for communication based on identification information about the plurality of external electronic devices which is contained in the plurality of messages received from the plurality of external electronic devices. Additionally or alternatively, the processor 120 may select an external electronic device for communication from among at least one external electronic device located within a designated distance in accordance with a user input. A specific method for selecting an external electronic device for communication is described below.

The processor 120 may broadcast connection requests for communication with the selected external electronic device through the communication module 190 using the first protocol. For example, the processor 120 may broadcast connection requests for second protocol-based communication in order to communicate with the external electronic device using a second protocol that differs from the first protocol. The second protocol may be a protocol (e.g., TCP/IP or UDP) for the processor 120 to communicate with a particular external electronic device.

In another example, to communicate with the external electronic device through a second channel which is different from a first channel used for broadcasting the messages, the processor 120 may broadcast connection requests for communication through the second channel.

In yet another example, to communicate with the external electronic device using the second protocol through the second channel, the processor 120 may broadcast connection requests for communication using the second protocol through the second channel.

The processor 120 may broadcast connection requests containing identification information corresponding to the external electronic device. For example, when the connection requests are broadcast in a BSM format based on a V2X-related standard, the identification information corresponding to the external electronic device may be included in an optional area of the BSM which includes the mandatory area and the optional area as defined in the V2X-related standard.

For example, the identification information corresponding to the external electronic device may include identification information for identifying the selected external electronic device itself or identification information for identifying an electronic device (e.g., an automobile) wiredly or wirelessly connected with the selected external electronic device.

In another example, where the external electronic device is a car, identification information for specifying the car, such as the plate number, type of car, or color of the car, may be included in the identification information corresponding to the external electronic device.

Further, where the external electronic device is a separate electronic device wiredly or wirelessly connected with the car, identification information for specifying the car wiredly or wirelessly connected with the external electronic device, such as the plate number, type of car, or color of the car, may be included in the identification information corresponding to the external electronic device.

The processor 120 may broadcast, using the first protocol, connection requests containing connection information about the electronic device 101 for second protocol-based communication and the identification information corresponding to the external electronic device. For example, the connection information about the electronic device 101 for second protocol-based communication may include connection information available for the second protocol-based communication, such as the media access control (MAC) address of the electronic device 101.

The connection requests may further contain location information corresponding to the electronic device 101. The processor 120 may include the location information in the connection requests to notify the external electronic device of the location of the electronic device 101. The external electronic device may be aware of the location of the electronic device 101 based on the location information contained in the connection request.

The processor 120 may broadcast the connection requests through the first channel using the first protocol. For example, the processor 120 may broadcast, using the first protocol, connection requests containing information about the second channel for communication with the external electronic device and the identification information corresponding to the external electronic device. For communication with the external electronic device, the processor 120 may include, in the connection requests, information about the second channel that differs from the channel used for broadcasting the connection requests.

Upon receipt of the connection request, the external electronic device may identify whether the connection requests were intended to be sent to the external electronic device based on the identification information corresponding to the external electronic device which is contained in the connection request.

Upon identifying that the connection requests were intended to be sent to the external electronic device, the external electronic device may determine whether to communicate with the electronic device 101 in accordance with, for example, a user input. Further, since the connection requests are broadcast, other external electronic devices than the external electronic device selected by the user might receive the connection requests. Upon receipt of the connection requests, the other external electronic devices may identify whether the connection requests were intended to be sent to the other external electronic devices based on the identification information corresponding to the external electronic device contained in the connection requests. Upon identifying that the connection requests are not intended to be sent to them, the other external electronic devices may disregard the connection requests.

Upon determining to communicate with the electronic device 101, the external electronic device may broadcast responses containing connection information about the external electronic device to communicate with the electronic device 101. In another example, upon determining not to communicate with the electronic device 101, the external electronic device may disregard the connection request or broadcast responses indicating a rejection of the communication.

For example, the external electronic device may broadcast the responses through the first channel. In another example, where the connection request contains information about the second channel, the external electronic device may broadcast the responses through the second channel based on the information about the second channel.

The responses may further contain identification information corresponding to the electronic device 101. The identification information contained in the responses may be used for the processor 120 to identify that the responses were intended to be sent to the processor 120.

For example, the identification information corresponding to the electronic device 101 may contain identification information for identifying the electronic device 101 itself or identification information for identifying another electronic device (e.g., a car) associated with the electronic device 101.

For example, where the electronic device 101 is a car or an electronic device equipped thereto, identification information for specifying the car, such as the plate number, type of car, or color of the car, may be contained in the identification information corresponding to the electronic device 101. In another example, where the electronic device 101 is a separate electronic device wiredly or wirelessly connected with the car, identification information for specifying the car connected with the electronic device 101, such as the plate number, type of car, or color of the car, may be contained in the identification information corresponding to the electronic device 101.

The processor 120 may receive the response to the connection request from the selected external electronic device through communication module 190. For example, where responses are broadcast from the external electronic device using the first protocol, the processor 120 may identify whether the responses were intended to be sent thereto based on the identification information corresponding to the electronic device 101 which is contained in the response.

The processor 120 may communicate with the external electronic device through the communication module 190 based on the connection information about the electronic device which is contained in the response.

For example, the connection information about the external electronic device may be connection information about the external electronic device for the second protocol-based communication and may include connection information available for the second protocol-based communication, such as the MAC address of the external electronic device. Further, upon receipt of the response, the processor 120 may change the protocol for use in communication through the communication module 190 from the first protocol to the second protocol. The processor 120 may communicate through the communication module 190 with the external electronic device using the second protocol based on the connection information about the external electronic device for the second protocol-based communication.

In another example, the processor 120 may change channels, but not protocols, for communicating with the external electronic device. Upon receipt of the response, the processor 120 may change the channel for communication via the communication module 190 from the first channel to the second channel. The processor 120 may communicate with the external electronic device using the first protocol through the second channel based on the connection information about the external electronic device.

In yet another example, the processor 120 may both change protocols and change channels for communication with the external electronic device. Upon receipt of the response, the processor 120 may change the channel for communication via the communication module 190 from the first channel to the second channel and change the protocol for communication via the communication module 190 from the first protocol to the second protocol. The processor 102 may communicate with the external electronic device using the second protocol through the second channel based on the connection information about the external electronic device.

Upon receipt of a response indicating the rejection of communication from the external electronic device, the processor 120 may display a message indicating a failure to communicate with the external electronic device on the display device 160 or output a voice indicating such a failure through the sound output device 155.

When the received connection request contains the connection information about the electronic device 101 for the second protocol-based communication, the external electronic device may send the response to the electronic device 101 using the second protocol, based on the connection information about the electronic device 101. Where the external electronic device sends the response to the electronic device 101 using the second protocol, the identification information about the electronic device 101 might not be contained in the response.

For example, the external electronic device may send the response to the electronic device 101 through the first channel using the second protocol. In another example, when the connection request contains the information about the second channel, the external electronic device may send the response to the electronic device 101 through the second channel. Upon receipt of the second protocol-based response, the processor 120 may perform the second protocol-based communication with the external electronic device based on the connection information about the external electronic device.

When at least one external electronic device is selected, the processor 120 may select at least one among a plurality of driving-related messages in accordance with a user input. For example, when at least one external electronic device is selected, the processor 120 may display a plurality of designated driving-related messages and receive a selection of at least one driving-related message to be transmitted to the at least one external electronic device. The processor 120 may select at least one driving-related message among a plurality of messages displayed in accordance with a user input.

The processor 120 may broadcast messages, which contain the at least one driving-related message selected and the identification information corresponding to the at least one external electronic device selected, through the communication module 190. For example, the processor 120 may broadcast the messages using the first protocol. Upon receipt of the messages, the at least one external electronic device may identify whether the messages were intended to be sent thereto based on the identification information corresponding to the at least one external electronic device which is contained in the messages. Upon identifying that the messages were intended for the at least one external electronic device, the at least one external electronic device may display the at least one driving-related message contained in the messages.

Figure 2A:
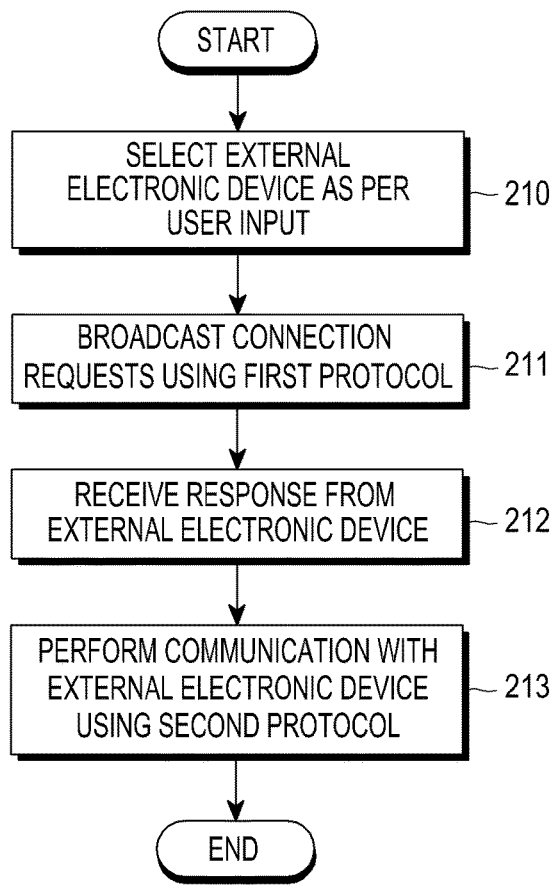
FIGS. 2A and 2B are flowcharts illustrating methods for communicating, by an electronic device, with an external electronic device, according to an embodiment.

FIG. 2A is a flowchart illustrating a method for communicating, by an electronic device, with an external electronic device, according to an embodiment.

In step 210, the processor 120 of the electronic device 101 may select an external electronic device to communicate with in accordance with a user input. For example, the processor may select an external electronic device for communication based on identification information about a plurality of external electronic devices which is contained in the plurality of messages received from the plurality of external electronic devices. In another example, the processor may select an external electronic device for communication from among at least one external electronic device located within a designated distance in accordance with a user input.

In step 211, the processor may broadcast connection requests for second protocol-based communication with the selected external electronic device through a communication circuit (e.g., the communication module 190) of the electronic device using the first protocol. For example, one or more communication circuits may be provided that support one or more communication schemes. Although the following description is directed to where one communication circuit supports a plurality of communication schemes, embodiments of the present disclosure are not limited thereto, and a plurality of communication circuits may support their respective corresponding communication schemes.

For example, the first processor may communicate by using a protocol in accordance with a V2X-related standard, and a message may be a V2X-related standard-based message (e.g., BSM). For example, the second protocol may be a protocol (e.g., TCP/IP or UDP) available for communication with a particular external electronic device.

In step 212, the processor may receive through the communication circuit a response to the connection request from the selected external electronic device. Such responses may be broadcast using the first protocol from the external electronic device. The processor may identify whether the responses were intended to be sent thereto based on the identification information corresponding to the electronic device 101 which is contained in the responses.

In step 213, the processor may perform communication through the communication circuit with the external electronic device using the second protocol based on the connection information about the external electronic device for the second protocol-based communication, which is contained in the response. For example, the connection information about the external electronic device for the second protocol-based communication may include connection information available for the second protocol-based communication, such as the MAC address of the external electronic device.

Figure 2B:
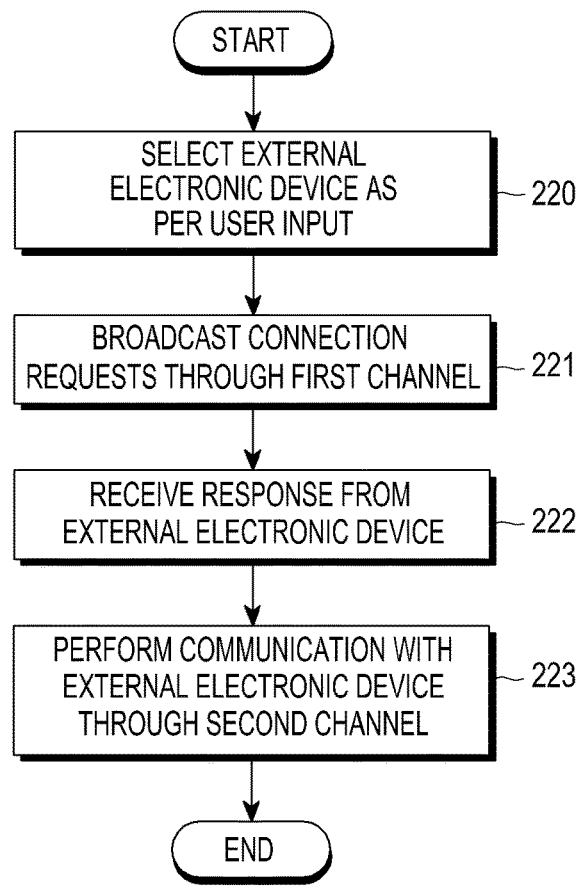

FIG. 2B is a flowchart illustrating a method for communicating, by an electronic device, with an external electronic device, according to an embodiment.

In step 220, the processor 120 of the electronic device 101 may select an external electronic device to communicate with in accordance with a user input. For example, the processor may select an external electronic device for communication based on identification information about a plurality of external electronic devices which is contained in the plurality of messages received from the plurality of external electronic devices. In another example, the processor may select an external electronic device for communication from among at least one external electronic device located within a designated distance in accordance with a user input.

In step 221, the processor may broadcast connection requests, which contain identification information corresponding to the external electronic device and second channel information for communication with the external electronic device, through a communication circuit (e.g., the communication module 190) of the electronic device 101 using the first channel. For example, in order to communicate with the external electronic device through the second channel which differs from the first channel through which the connection requests are broadcast, the processor may include the second channel information in the connection requests.

In step 222, the processor may receive, through the communication circuit, a response to the connection request from the selected external electronic device. For example, such responses may be broadcast using the first channel from the external electronic device. The processor may identify whether the responses were intended to be sent thereto based on the identification information corresponding to the electronic device 101 which is contained in the responses.

According to another example, such responses may be broadcast using the second channel from the external electronic device. In accordance with a preset rule, the external electronic device may broadcast the responses through the second channel. After broadcasting the connection requests, the processor may change the channel for communication from the first channel to the second channel in accordance with the preset rule and may monitor whether the responses are received through the second channel. For example, the rule may be set to perform the communication between the electronic device 101 and the external electronic device through the second channel, which differs from the first channel, in accordance with the connection request.

In step 223, the processor may perform communication through the communication circuit with the external electronic device using the second protocol based on the connection information about the external electronic device, which is contained in the response. For example, upon receipt of the response through the first channel, the processor may change the channel for communication from the first channel to the second channel and may communicate with the external electronic device through the second channel.

Figure 3:
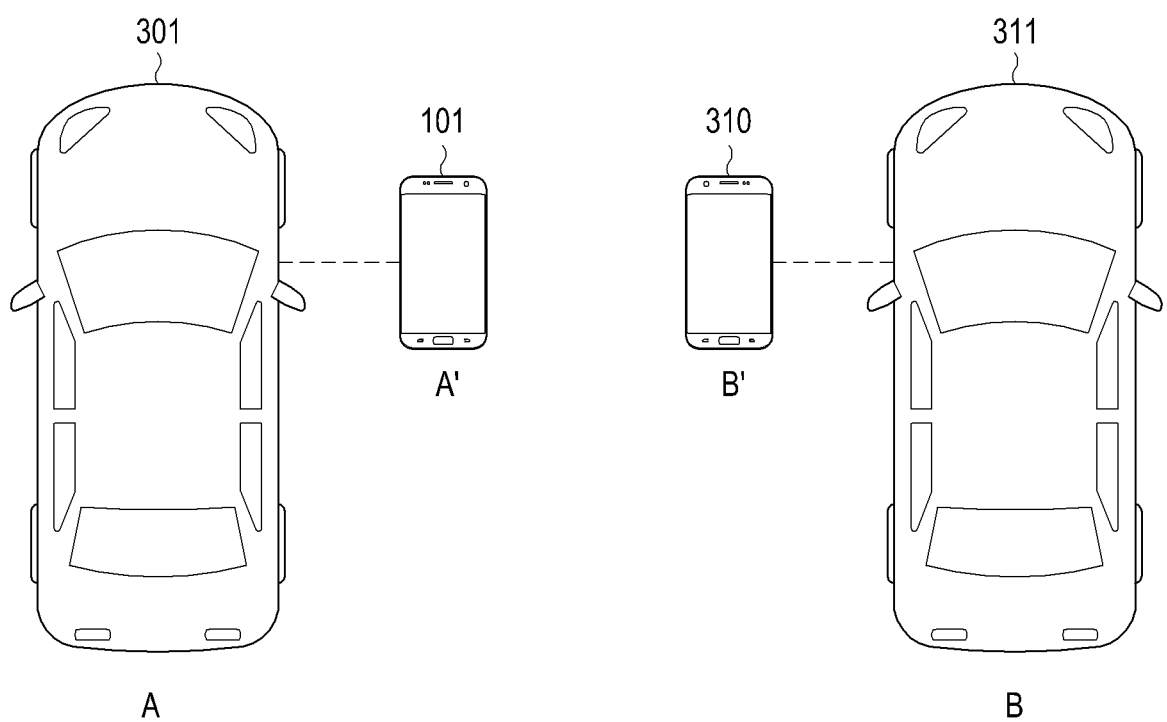
FIG. 3 is a view illustrating an electronic device and an external electronic device, according to an embodiment.

FIG. 3 is a view illustrating an electronic device and an external electronic device, according to an embodiment.

Referring to FIG. 3, the electronic device 101 may be equipped in a car 301 or may be a separate electronic device wiredly or wirelessly connected with the car 301. For example, the electronic device 101 may be equipped in the car 301 and communicate with an external electronic device 310. In another example, the electronic device 101 may be wiredly or wirelessly connected with the car 301 and control at least one function that the car 301 supports and communicate with the external electronic device 310. Although the electronic device 101 is described as being a separate electronic device from the car 301, the electronic device 101 may also be the car 301, but not is limited thereto.

The external electronic device 310 may be equipped in a car 311 or may be a separate electronic device wiredly or wirelessly connected with the car 311. For example, the external electronic device 310 may be equipped in the car 311 and communicate with the electronic device 101. In another example, the external electronic device 310 may be wiredly or wirelessly connected with the car 311, control at least one function that the car 311 supports, and communicate with the electronic device 101.

Although the following description focuses primarily on the operation of the electronic device 101, embodiments of the present disclosure are not limited thereto, and various embodiments of the present disclosure may be carried out by automobiles wiredly or wirelessly connected with the electronic device 101 under the control of the electronic device 101.

Figure 4:
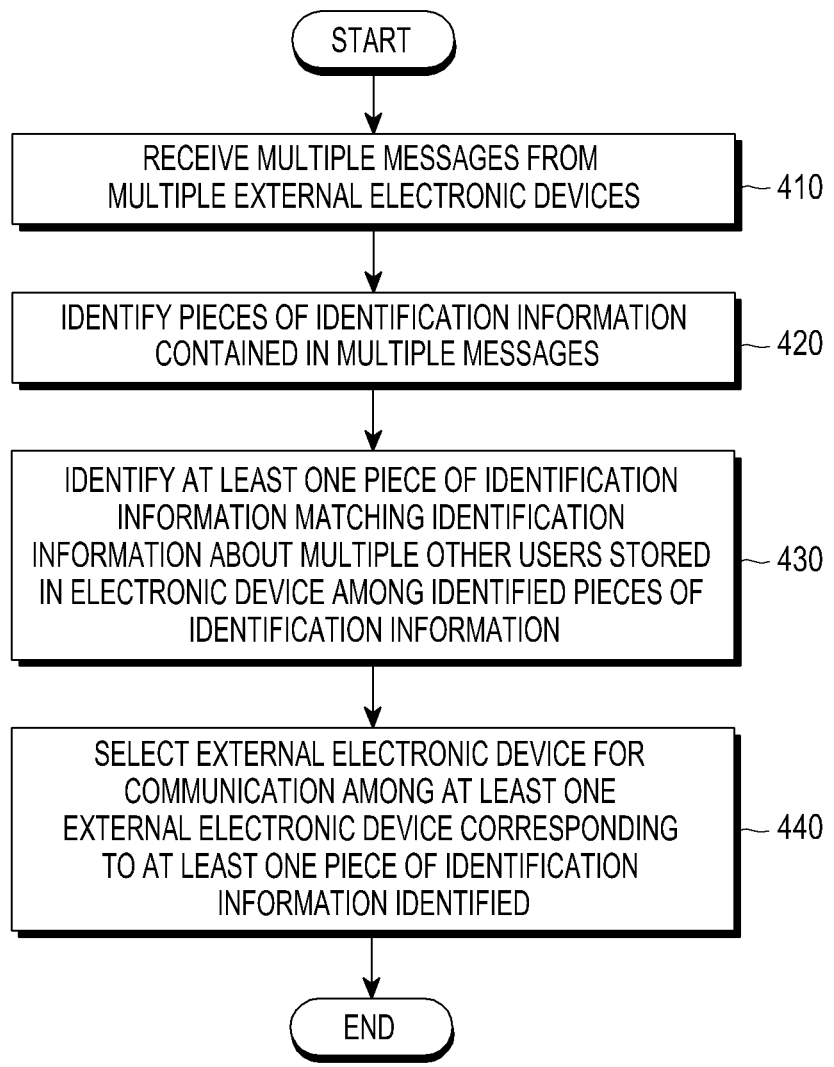
FIG. 4 is a flowchart illustrating a method for selecting at least one external electronic device with which an electronic device is to communicate, according to an embodiment.

FIG. 4 is a flowchart illustrating a method for selecting at least one external electronic device with which an electronic device is to communicate, according to an embodiment.

In step 410, the processor 120 of the electronic device 101 may receive a plurality of messages broadcast from a plurality of external electronic devices through a communication circuit (e.g., the communication module 190). For example, the plurality of external electronic devices each may broadcast BSMs using a first protocol (e.g., WSMP). The plurality of external electronic devices may include their identification information in the messages.

In step 420, the processor may identify the plurality of pieces of identification information contained in the plurality of messages received. The processor may identify the plurality of external electronic devices that broadcasted the plurality of messages by identifying the plurality of pieces of identification information.

In step 430, the processor may identify at least one piece of identification information that matches pieces of identification information about a plurality of other users which are stored in the memory 130 of the electronic device 101, among the plurality of pieces of identification information identified.

For example, the memory may store identification information about the plurality of other users entered by the user. The plurality of pieces of identification information about the plurality of other users may include identification information (e.g., plate numbers, types of cars, or colors of cars) about the cars of the plurality of other users.

In another example, the identification information about the plurality of other users may be mapped to identification information about the cars of the plurality of other users. The processor may identify the identification information about the cars of the plurality of other users using the identification information about the plurality of other users.

In another example, the identification information about the plurality of other users may be mapped to contact information about the plurality of other users which is stored in the memory. For example, when the plurality of messages received contain only the contact information about the plurality of other users, the processor may identify the identification information about the plurality of other users using the contact information about the plurality of users.

The processor may identify at least one piece of identification information that matches identification information about a plurality of other users associated with the user of the electronic device 101 through another external electronic device (e.g., an external server) that manages car-related information among the plurality of pieces of identification information identified. For example, the external server may store the identification information about the plurality of other users (e.g., the identification information about the cars of the plurality of other users), in association with the user of the electronic device 101.

For example, the processor may send, to the external server, the plurality of pieces of identification information identified, along with a request for identifying whether at least one piece of identification information matching the identification information about the plurality of other users is among the plurality of pieces of identification information identified. In response to the identification request, the external server may search the plurality of pieces of identification information identified for at least one piece of identification information matching the identification information about the plurality of other users and send a result of the search to the electronic device 101. The processor may identify the at least one piece of identification information based on the received search result.

In step 440, the processor may select an external electronic device for communication in accordance with a user input from among at least one external electronic device corresponding to at least one piece of identification information identified.

The processor may provide the user of the electronic device 101 with information about at least one external electronic device corresponding to the at least one piece of identification information identified. For example, the processor may audibly output the information about the at least one external electronic device through a speaker (e.g., the sound output device 155). After outputting the information about the at least one external electronic device, the processor may select an external electronic device for communication in accordance with the user's voice input.

Figure 5C:
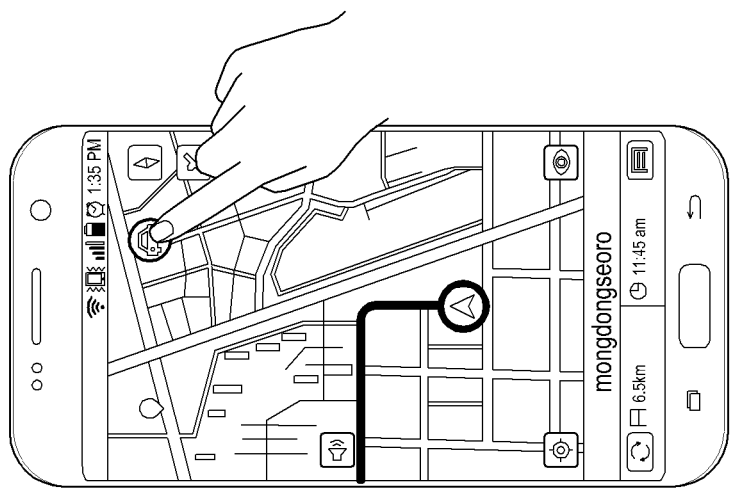
FIGS. 5A to 5C are views illustrating a method for selecting at least one external electronic device with which an electronic device is to communicate, according to an embodiment.

In another example, the processor may display the information about the external electronic device through the display device 160. For example, as shown in FIG. 5A, the processor may display, through the display, an execution screen of a navigation application being executed. Upon identifying the at least one piece of identification information, the processor may identify the location of the at least one external electronic device corresponding to the at least one piece of identification information. For example, the processor may receive a message from the at least one external electronic device and identify the location information corresponding to the at least one external electronic device contained in the message. The processor may identify the location of the at least one external electronic device based on the identified location information. However, this example is merely for illustration purposes, and embodiments of the present disclosure are not limited thereto. The processor may identify the location of the at least one external electronic device in various manners.

Figure 5B:
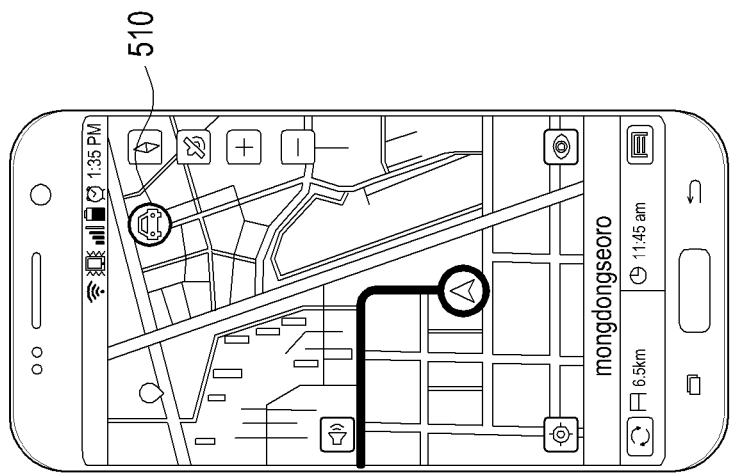
Figure 5A:
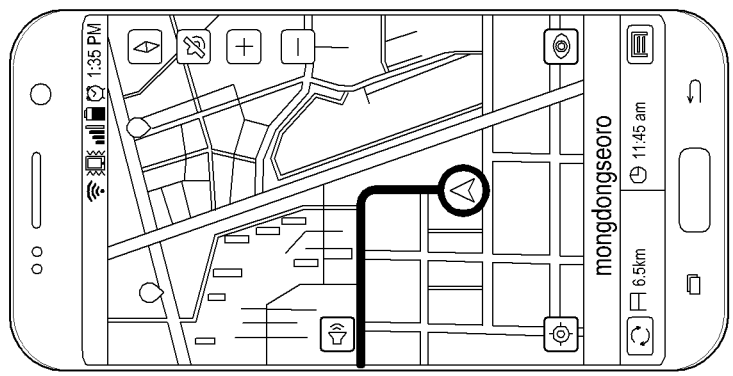

For example, as shown in FIG. 5B, the processor may display, on the execution screen of the navigation application, at least one graphical object 510 corresponding to the at least one external electronic device, based on the identified location of the at least one external electronic device. As shown in FIG. 5C, the processor may select an external electronic device corresponding to the graphical object 510 as the external electronic device for communication, in accordance with a user input to select the graphical object 510.

Figure 6:
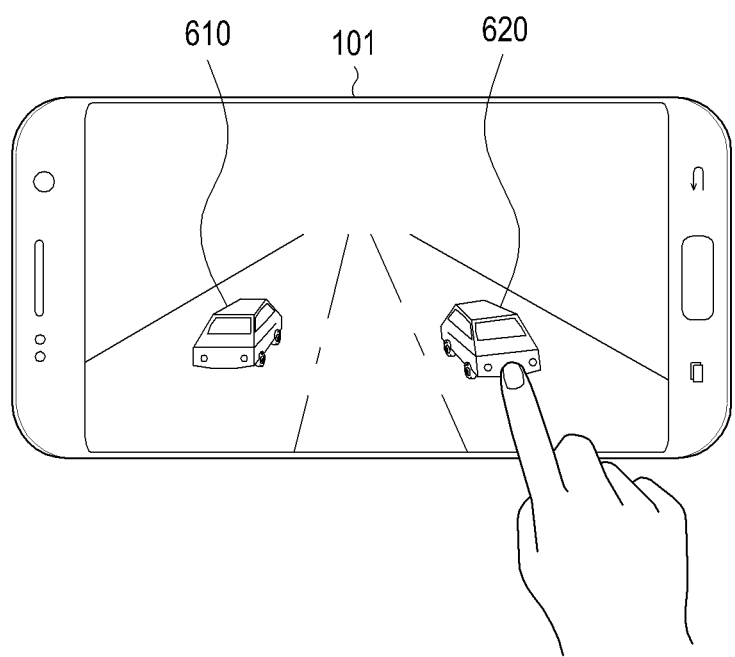
FIGS. 6 and 7 are views illustrating a method for selecting at least one external electronic device with which an electronic device is to communicate, according to an embodiment.

FIG. 6 is a view illustrating a method for selecting at least one external electronic device with which an electronic device is to communicate, according to an embodiment.

Referring to FIG. 6, a processor of the electronic device 101 may recognize at least one external electronic device from an image obtained through a camera (e.g., the camera module 180) of the electronic device 101. In another example, the processor may recognize the at least one external electronic device using various pieces of information obtained through a sensor (e.g., the sensor module 176) of the electronic device 101. Further, the electronic device 101 may recognize the at least one external electronic device using an image obtained from a camera of a car wiredly or wirelessly connected with the electronic device 101 or using various pieces of information obtained through a sensor of the car.

The processor may provide the user of the electronic device 101 with information about the at least one external electronic device recognized. For example, the processor may audibly output the information about the at least one external electronic device through a speaker (e.g., the sound output device 155). After outputting the information about the at least one external electronic device, the processor may select an external electronic device for communication in accordance with the user's voice input.

In another example, the processor may display the information about the recognized external electronic device through the display device 160. Where a first external electronic device 610 and a second external electronic device 620 are recognized through at least one of the camera or the sensor as shown in FIG. 6, the processor may display graphical objects corresponding to the first external electronic device 610 and the second external electronic device 620 through the display. Upon receipt of a user input to select the second external electronic device 620, the processor may select the second external electronic device 620 as the external electronic device for communication.

Figure 7:
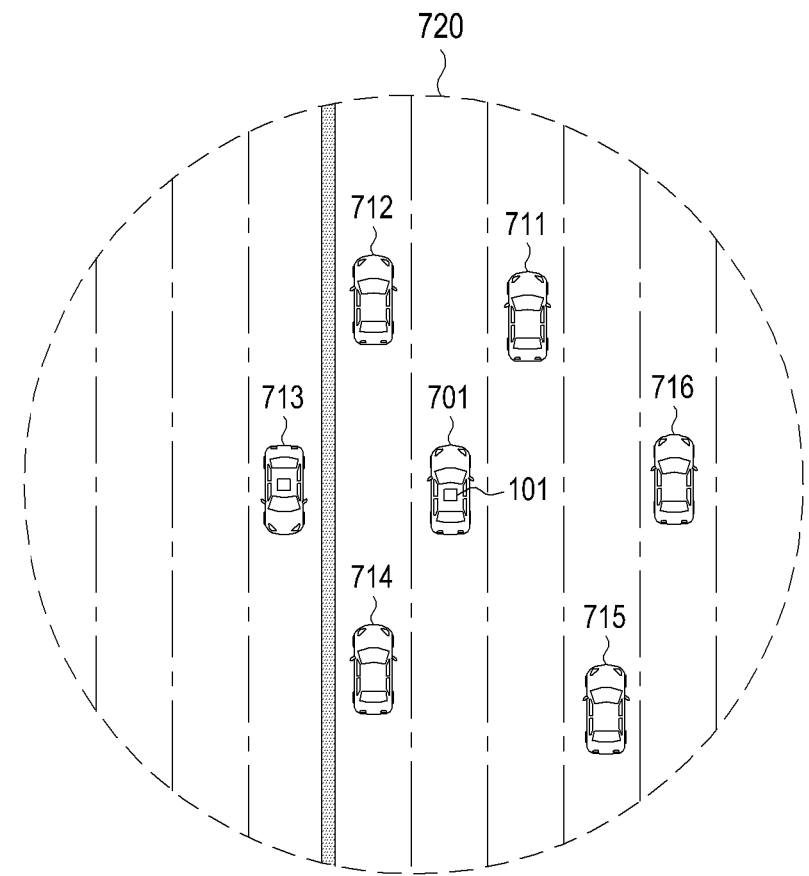

FIG. 7 is a view illustrating a method for selecting at least one external electronic device with which an electronic device is to communicate, according to an embodiment.

The electronic device 101 may be equipped in a car 701 or may be a separate electronic device wiredly or wirelessly connected with the car 701.

The processor 120 of the electronic device 101 may receive an input to select the external electronic device for communication through the input device 150 of the electronic device 101. For example, the processor may receive a voice input to select the external electronic device from the user through a microphone included in the input device.

The processor may select at least one external electronic device corresponding to the user input from among a plurality of external electronic devices (e.g., cars) 711, 712, 713, 714, 715, and 716 that are located within a designated range 720.

For example, the processor may recognize the plurality of external electronic devices 711, 712, 713, 714, 715, and 716 within the designated range 720 using various pieces of information obtained through the sensor module 176 or an image obtained through the camera module 180 of the electronic device 101. The processor may select at least one external electronic device corresponding to the user input from among the plurality of recognized external electronic devices 711, 712, 713, 714, 715, and 716. In another example, the processor may recognize the at least one external electronic device using an image obtained from a camera of a car wiredly or wirelessly connected with the electronic device 101 or various pieces of information obtained through a sensor of the car.

For example, where the user input is a "white, type-A car driving ahead," the processor may recognize at least one external electronic device, that is a white, type-A car driving ahead of the electronic device 101, among the plurality of external electronic devices 711, 712, 713, 714, 715, and 716, based on an image obtained through the camera of the electronic device 101 or car, or various pieces of information obtained through the sensor of the electronic device 101 or car. The processor may select the at least one external electronic device recognized as the at least one external electronic device for communication.

In another example, the processor may obtain identification information (e.g., the plate number) corresponding to the at least one recognized external electronic device using the camera of the electronic device 101 or car. The processor may provide the user with the identification information about the at least one external electronic device obtained, requesting the user to identify whether the external electronic device is the one that the user intended.

The processor may broadcast, through a communication circuit (e.g., the communication module 190), connection requests for communication with the at least one recognized external electronic device. The processor may include the obtained identification information corresponding to the at least one external electronic device in the connection requests and broadcast the connection requests.

Figure 8:
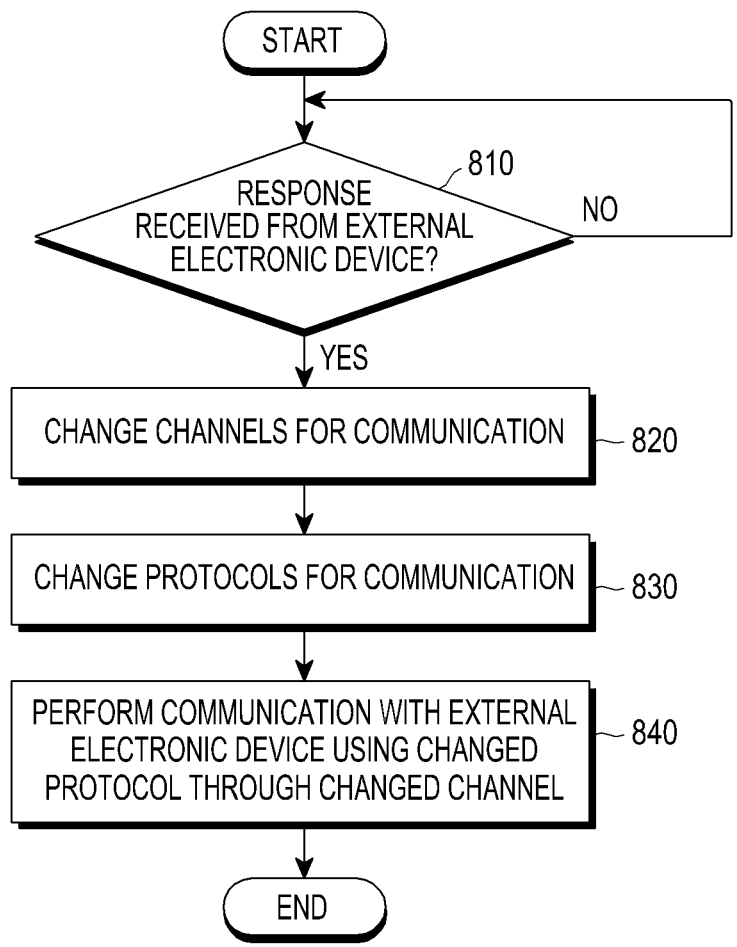
FIG. 8 is a flowchart illustrating a method for communicating, by an electronic device, with an external electronic device, according to an embodiment.

FIG. 8 is a flowchart illustrating a method for communicating, by an electronic device, with an external electronic device, according to an embodiment.

In step 810, the processor 120 of the electronic device 101 may broadcast connection requests for communication with an external electronic device selected by the user and may then monitor whether a response corresponding to the connection request is received from the external electronic device through the communication module 190 (e.g., a communication circuit) of the electronic device 101.

In step 820, upon receipt of the response from the external electronic device through the communication circuit, the processor may change the channel for communication through the communication circuit from the first channel to the second channel. For example, the first channel may be a channel used for broadcasting the connection requests, and the second channel may be a channel used for communication with the external electronic device in a unicast scheme.

In step 830, upon receipt of the response from the external electronic device through the communication circuit, the processor may change the protocol for communication through the communication circuit from the first protocol to the second protocol. For example, the first protocol may be a protocol used for broadcasting the connection requests, and the second protocol may be a protocol used for communication with the external electronic device in a unicast scheme.

Although step 830 is performed after step 820 in the above description, this is merely for description purposes, and embodiments of the present disclosure are not limited thereto. For example, step 820 may be performed after or simultaneously with step 830.

In step 840, the processor may perform communication with the external electronic device through the communication circuit using the second channel and the second protocol.

The processor may change either the channel or the protocol. For example, for communication with the external electronic device, the processor may change the protocol, but not the channel, or may change the channel, but not the protocol.

For example, step 830 may be omitted when only the channel is changed for communication with the external electronic device. Alternatively, step 820 may be omitted when only the protocol is changed for communication with the external electronic device.

Figure 9:
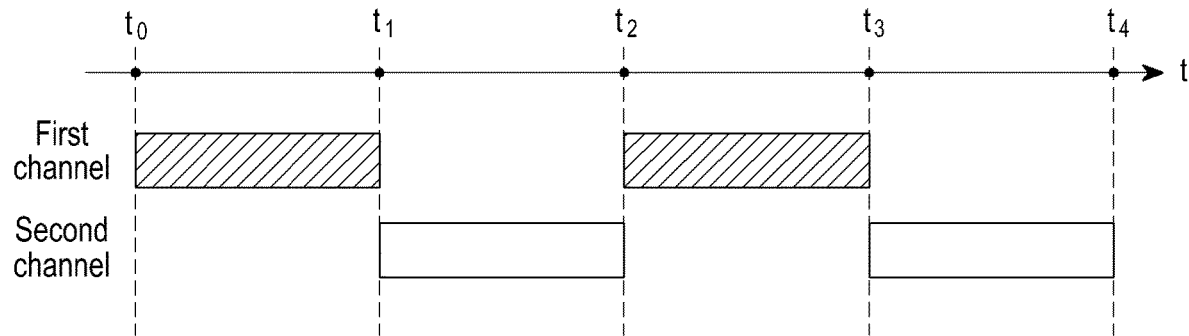
FIG. 9 is a view illustrating a method for changing channels for communicating, by an electronic device, with an external electronic device, according to an embodiment.

FIG. 9 is a view illustrating a method for changing channels for communicating, by an electronic device, with an external electronic device, according to an embodiment.

The processor 120 of the electronic device 101 may change channels for communication with an external electronic device selected as a user input.

For example, in a time period from t0 to t1, the processor may broadcast connection requests for communication with the selected external electronic device through the first channel. The processor may change the channel for communication from the first channel to the second channel upon receipt of a response from the external electronic device in response to the connection request.

For example, in a time period from t1 to t2, the processor may perform communication with the external electronic device through the second channel. When the communication with the external electronic device terminates, the processor may change the channel for communication from the second channel back to the first channel.

According to another example, upon receipt of a user input to communicate with the external electronic device or another external electronic device in a time period from t2 to t3, the processor may broadcast, through the first channel, connection requests for communication with the external electronic device or the other external electronic device. Upon receipt of a response from the external electronic device or the other external electronic device in response to the connection request, the processor may change the channel for communication from the first channel to the second channel.

For example, in a time period from t3 to t4, the processor may perform communication with the external electronic device or the other external electronic device through the second channel. When the communication with the external electronic device or the other external electronic device terminates, the processor may change the channel for communication from the second channel back to the first channel.

Figure 10:
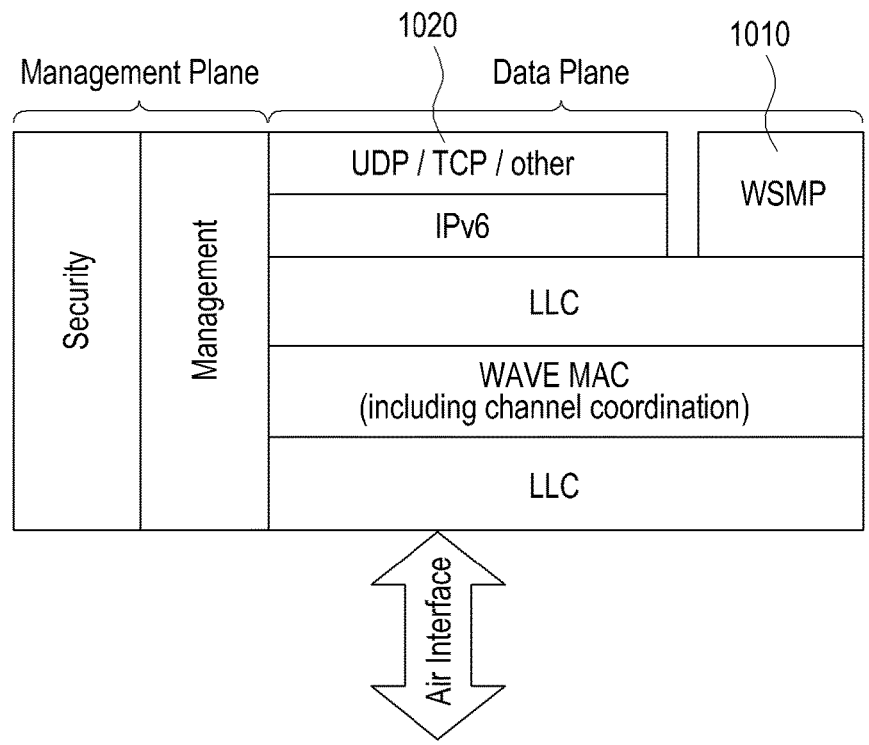
FIG. 10 is a view illustrating a method for changing protocols for communicating, by an electronic device, with an external electronic device, according to an embodiment.

FIG. 10 is a view illustrating a method for changing protocols for communicating, by an electronic device, with an external electronic device, according to an embodiment.

The processor 120 of the electronic device 101 may change protocols for communication with an external electronic device selected as a user input.

For example, the processor may broadcast connection requests for communication with the selected external electronic device using the first protocol 1010 (e.g., WSMP).

Upon receipt of a response from the external electronic device in response to the connection request, the processor may change the protocol for use in communication from the first protocol 1010 to the second protocol 1020 (e.g., TCP/IP or UDP).

The processor may perform communication with the external electronic device using the second protocol 1020 and using connection information about the external electronic device for second protocol-based communication contained in the response.

When the communication with the external electronic device ends, the processor may change the protocol for use in communication from the second protocol 1020 back to the first protocol 1010.

Figure 11:
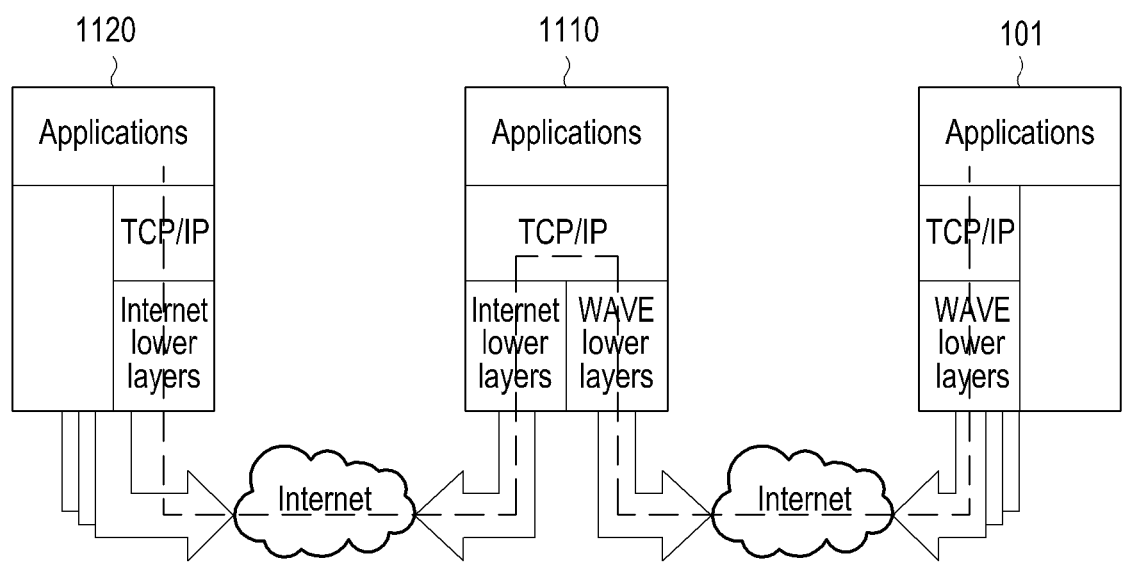
FIG. 11 is a view illustrating a method for communicating, by an electronic device, with an external electronic device, through a road side unit (RSU) or an external server, according to an embodiment.

FIG. 11 is a view illustrating a method for communicating, by an electronic device, with an external electronic device through a road side unit (RSU) or an external server, according to an embodiment.

The processor 120 of the electronic device 101 may perform communication with an external electronic device 1120 selected in accordance with a user input through an RSU 1110 or an external server. For example, the RSU 1110 may refer to infrastructure, such as traffic lights or traffic monitors.

For example, the processor may broadcast connection requests for second protocol-based communication (e.g., TCP/IP or UDP) to the external electronic device 1120 using the first protocol (e.g., WSMP). The connection request may be delivered to the external electronic device 1120 directly via the RSU 1110, or through an external server.

For example, the processor may perform the second protocol-based communication through a communication circuit (e.g., the communication module 190) of the electronic device upon receipt of a response to the connection request from the external electronic device 1120. The processor may perform the second protocol-based communication with the external electronic device 1120 directly, or as shown in FIG. 11, via the RSU 1110 or through an external server.

Figure 12:
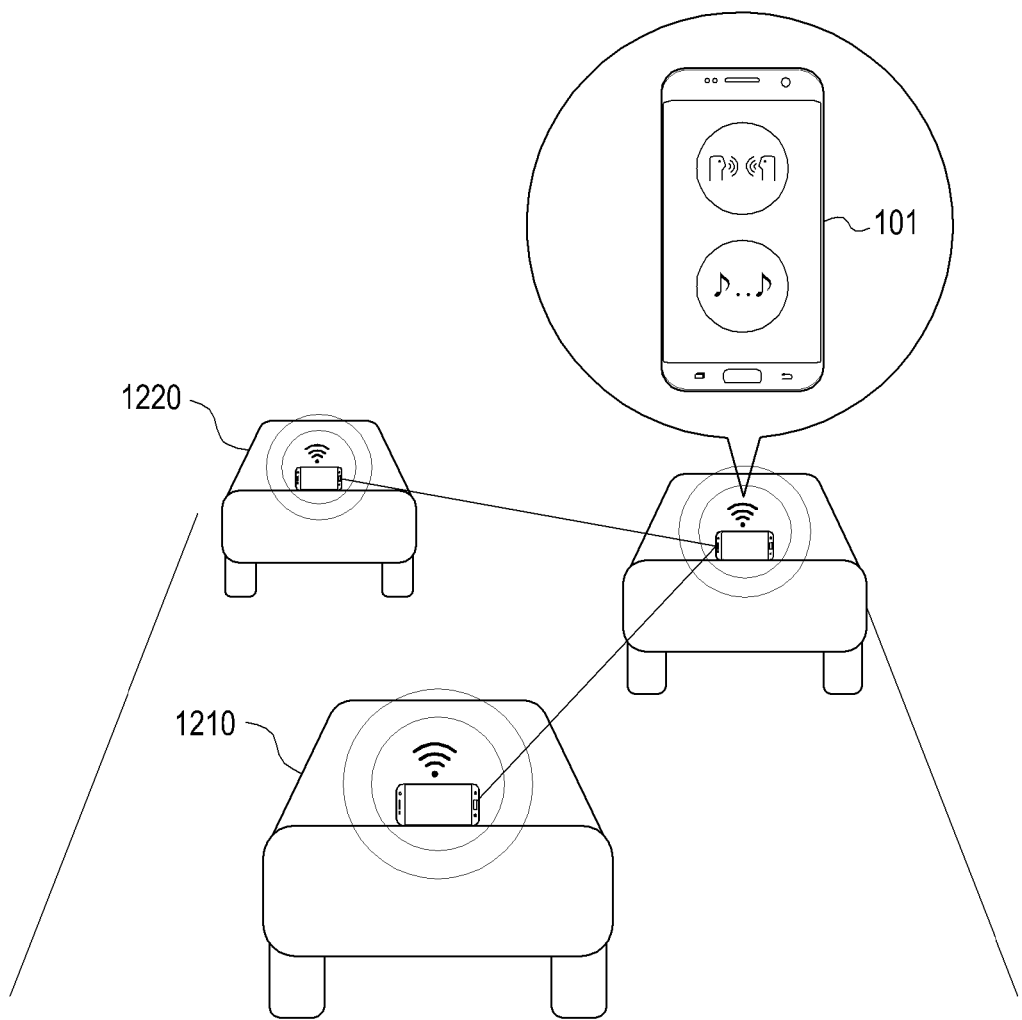
FIG. 12 is a view illustrating an electronic device and a plurality of electronic devices among which communication connections have been established, according to an embodiment.

FIG. 12 is a view illustrating an electronic device and a plurality of electronic devices among which communication connections have been established, according to an embodiment.

The processor 120 of the electronic device 101 may send a connection request for communication to at least one external electronic device selected in accordance with a user input and perform communication with the at least one external electronic device. For example, the processor may change at least one of the channel or protocol for use in communication to communicate with the at least one external electronic device. The processor may perform communication with the at least one external electronic device using at least one of the changed protocol or channel.

The processor may establish communication connections with a first external electronic device 1210 and a second external electronic device 1220 and share content, such as music or video, with the first external electronic device 1210 and the second external electronic device 1220 based on the established communication connections. In another example, a user of the electronic device 101 may perform voice calls with a user of the first external electronic device 1210 and a user of the second external electronic device 1220 based on the established communication connections.

Accordingly, as communication connections are established between the electronic device 101 and the first external electronic device 1210 and between the electronic device 101 and the second external electronic device 1220, the respective users of the electronic device 101, the first external electronic device 1210, and the second external electronic device 1220, although being located in different sites, may carry out communication and share the same content through the electronic device 101, the first external electronic device 1210, and the second external electronic device 1220.

Figure 13:
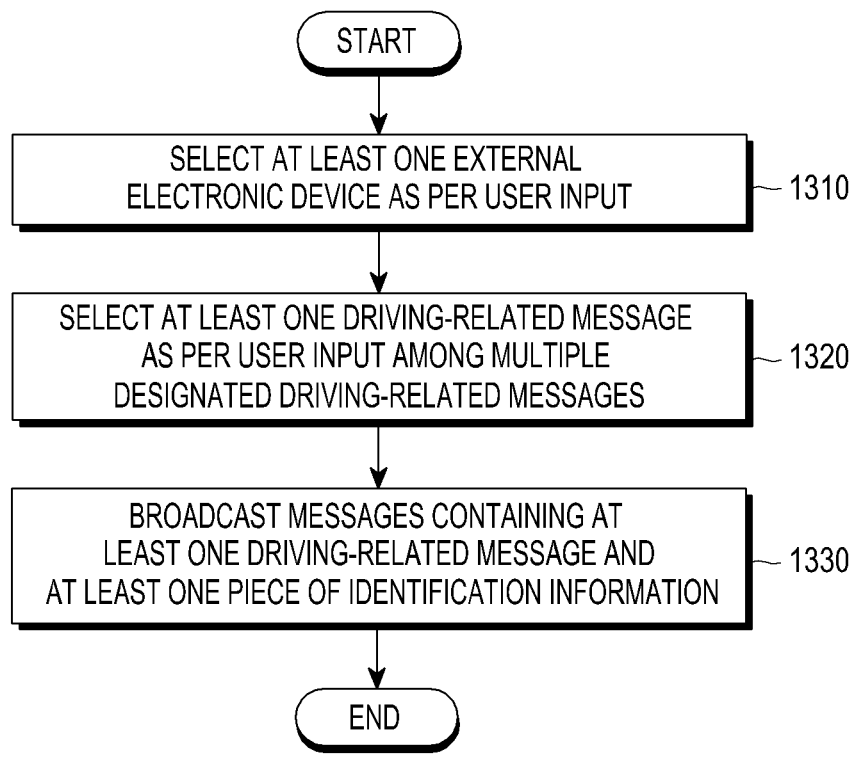
FIG. 13 is a flowchart illustrating a method for transmitting, by an electronic device, messages to at least one external electronic device, according to an embodiment.

FIG. 13 is a flowchart illustrating a method for transmitting, by an electronic device, messages to at least one external electronic device, according to an embodiment.

In step 1310, the processor 120 of the electronic device 101 may select at least one external electronic device to send BSMs in accordance with a user input. For example, the processor may select the external electronic device to which to send the messages based on identification information about a plurality of external electronic devices which is contained in the plurality of messages received from the plurality of external electronic devices. In another example, the processor may select the external electronic device to send the messages from among at least one external electronic device located within a designated distance in accordance with a user input. How to select the external electronic device may be the same as the methods described above in connection with FIGS. 4 to 7.

In step 1320, the processor may select at least one driving-related message in accordance with a user input from among a plurality of designated driving-related messages. For example, the driving-related messages may include various messages to alert, notify, or inform the car driver in relation to driving the car.

The processor may select at least one driving-related message from among the plurality of driving-related messages in accordance with a voice input received from the user. For example, the processor may recognize the voice input and select the driving-related message corresponding to the voice input from among the plurality of driving-related messages. The plurality of driving-related messages may be associated with respective numbers or keywords as set forth in Table 1 below:

TABLE 1

| Numbers | Keywords | Driving-related messages |
| --- | --- | --- |
| 1 | headlight | Headlight off. Please check |
| 2 | drowsy driving | Drowsy? Please drive safely |
| 3 | Taillight | Taillight off. Please check |
| 4 | speed up, new driver | A car is tailgating. Let it pass |
| 5 | bad driving, manner, police, crackdown | Please drive safely |
| 6 | thank, yield | Thank you for your courtesy |
| 7 | load, improper, cargo, likely to fall, rear, danger | Improper load. Please check |

The driving-related messages set forth in Table 1 are merely for description purposes, and other various messages not limited thereto, may be available, such as ones to alert, notify, or provide information to the car driver while driving the car. Further, the numbers or key words indicating the driving-related messages set forth in [Table 1] are intended only for illustration purposes, and embodiments of the present disclosure are not limited thereto.

For example, upon receiving the voice message, "Send me the number 1 message," from the user, the processor may recognize the voice input and select the "Headlight off. Please check" which is the driving-related message corresponding to "number 1."

In another example, upon receiving the voice input, "Send me the drowsy driving message," from the user, the processor may recognize the voice input and select the "Drowsy? Please drive safely," which is the driving-related message corresponding to "drowsy driving."

In another example, upon receiving the voice input, "Send me the number 2 message and the taillight message," from the user, the processor may recognize the voice input and select "Drowsy? Please drive safely," which is the driving-related message corresponding to the "number 2", and select "Taillight off. Please check," which is the driving-related message corresponding to the "taillight."

The processor may display the plurality of driving-related messages through a display (e.g., the display device 160). For example, the processor may display the plurality of driving-related messages through the display when at least one external electronic device is selected by a user input. In another example, the processor may display the plurality of driving-related messages through the display upon receipt of a user input to send messages.

The processor may select at least one driving-related message in accordance with a user input received through the display after the plurality of driving-related messages are displayed. For example, upon receipt of a touch input on an area where the "Please drive safely" is displayed from the user, the processor may select the "Please drive safely," which is the driving-related message corresponding to the touch input from among the plurality of driving-related messages.

In step 1330, the processor may broadcast messages containing the at least one driving-related message selected and identification information corresponding to the at least one external electronic device selected, through the communication module 190 (e.g., a communication circuit). For example, the processor may obtain the identification information corresponding to the selected external electronic device from the memory 130 of the electronic device 101 or an external server managing the identification information about the plurality of external electronic devices. In another example, the processor may obtain the identification information corresponding to the selected external electronic device through the camera module 180 of the electronic device 101 or the sensor module 176 of the electronic device 101.

When the messages broadcast are in a V2X-related standard-based BSM format, the identification information corresponding to the external electronic device and the at least one driving-related message selected may be included in the optional area of the BSM, which includes the mandatory area and the optional area as defined in the standard.

The selected external electronic device may receive the messages broadcast from the electronic device 101. Upon receipt of the messages, the external electronic device may identify the identification information contained in the messages and identify whether the messages were intended to be sent thereto based on the identification information.

When the identification information matches the identification information about the external electronic device, the external electronic device may conclude that the messages were intended to be sent thereto and may either display the messages through the display or output the messages through the speaker, the at least one driving-related message being contained in the message.

In another example, when the identification information does not match the identification information about the external electronic device, the external electronic device may conclude that the message was not intended for the external electronic device and may disregard the message.

The processor may recognize a user input, include the recognized user input in each message, and broadcast the messages. For example, where the driving-related message corresponding to the user input is not identified from the plurality of driving-related messages or where the processor intends to transmit a particular message other than the plurality of driving-related messages, the processor may include the recognized user input itself in the messages and broadcast the messages.

Figure 14:
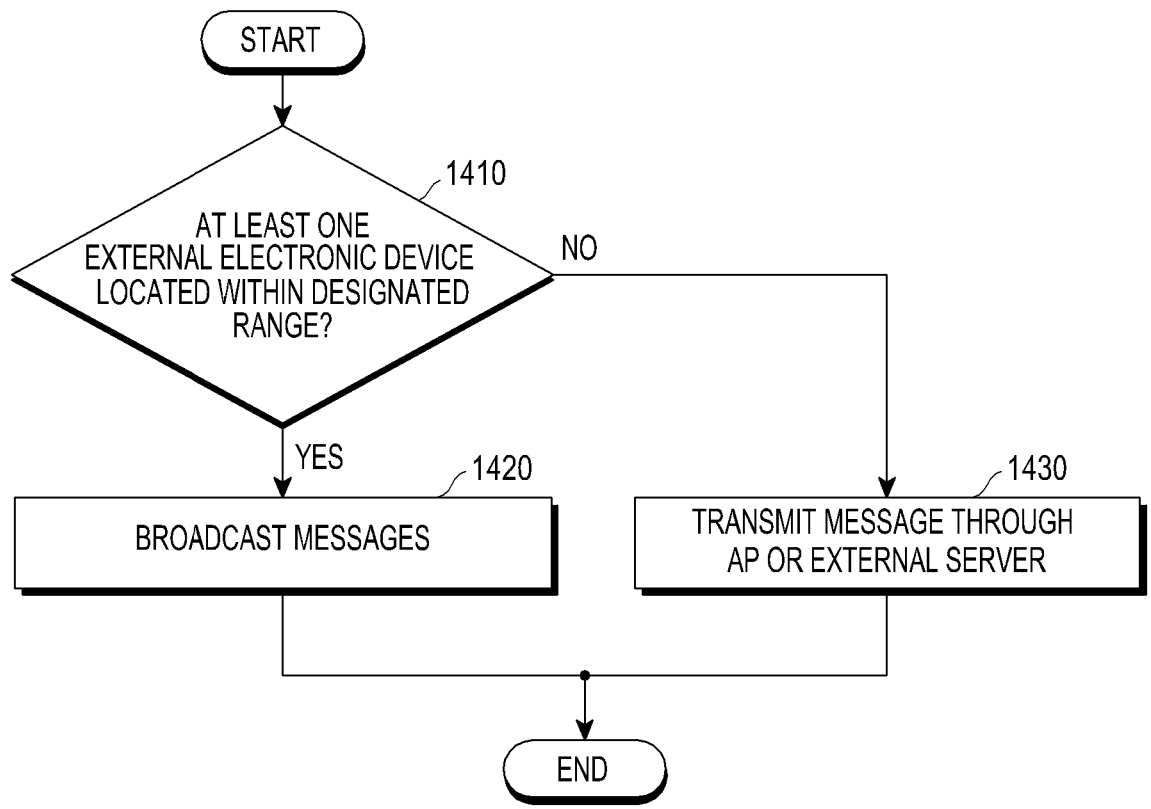
FIG. 14 is a flowchart illustrating a method for selecting a message transmission scheme by an electronic device, according to an embodiment.

FIG. 14 is a flowchart illustrating a method for selecting a message transmission scheme by an electronic device, according to an embodiment.

In step 1410, the processor 120 of the electronic device 101 may identify whether at least one external electronic device selected by the user is within a designated range. For example, the designated range may be set as a range in which messages broadcast using the first protocol are reachable.

The processor may identify the distance between the at least one external electronic device and the electronic device 101, or the location of the at least one external electronic device. The processor may identify whether the at least one external electronic device is within the designated range based on the identified location of the at least one external electronic device or the distance between the electronic device 101 and the at least one external electronic device.

Figure 15:
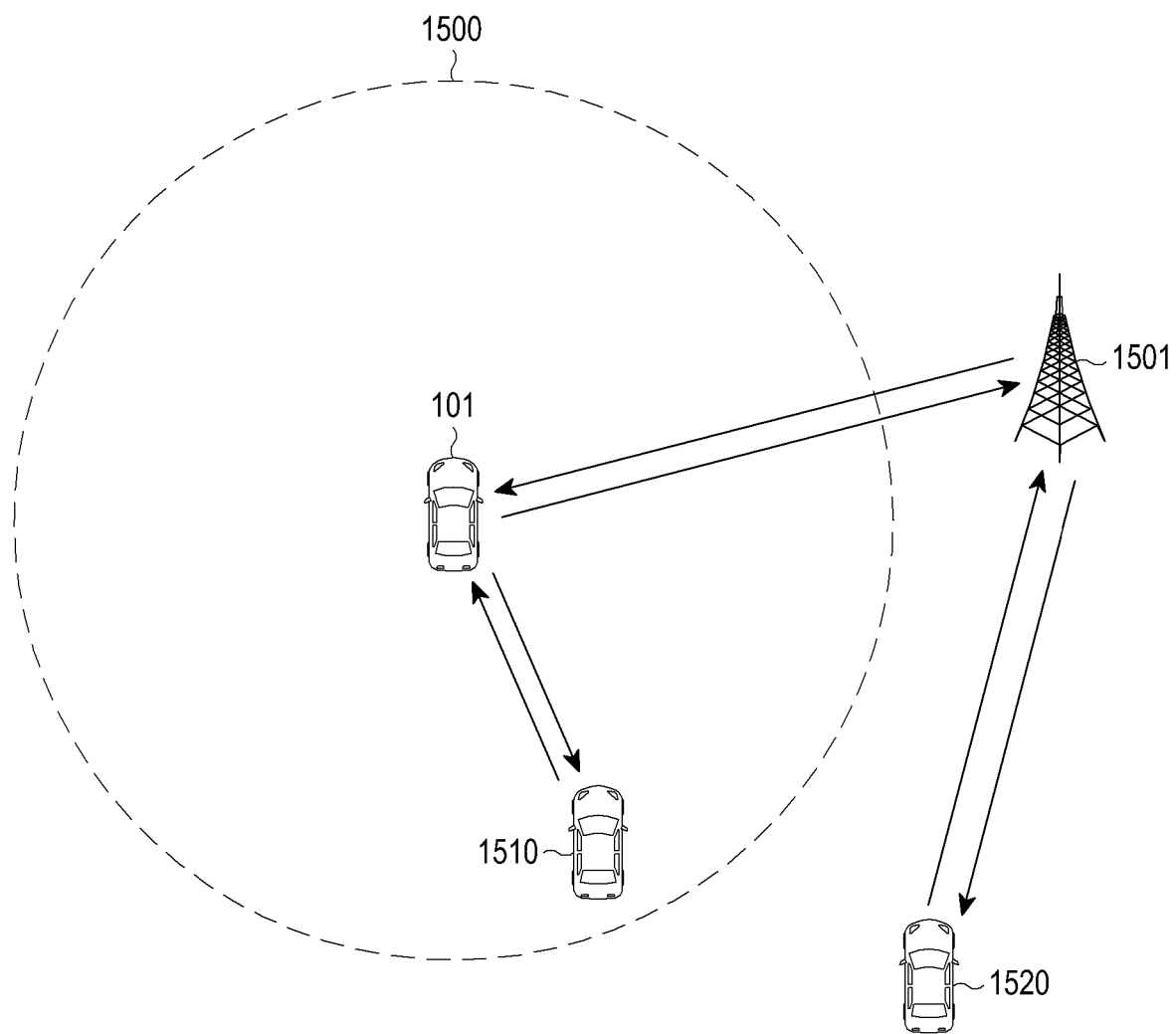
FIG. 15 is a view illustrating a method for selecting a message transmission scheme by an electronic device, according to an embodiment of the present disclosure.

Referring to FIG. 15, the processor may identify whether a first external electronic device 1510 and a second external electronic device 1520 are within the designated range 1500. The processor may identify that the first external electronic device 1510 is within the designated range 1500 based on the location of the first external electronic device 1510 or the distance between the electronic device 101 and the first external electronic device 1510.

In another example, the processor may identify that the second external electronic device 1520 is outside the designated range 1500 based on the location of the second external electronic device 1520 or the distance between the electronic device 101 and the second external electronic device 1520.

In step 1420, when the at least one external electronic device is within the designated range, the processor may broadcast the messages using the first protocol. Referring to FIG. 15, since the first external electronic device 1510 is within the designated range 1500, the processor may include the identification information corresponding to the first external electronic device 1510 in the messages and broadcast the messages so as to deliver the message to the first external electronic device 1510.

In step 1430, when the at least one external electronic device is outside the designated range, the processor may deliver the message to the at least one external electronic device via an access point or external server. Referring to FIG. 15, since the second external electronic device 1520 is outside the designated range 1500, the processor may transfer the message via the access point 1501 to the second external electronic device 1520 so as to deliver the message to the second external electronic device 1520. In order to transfer the message via the access point 1501 to the second external electronic device 1520, the processor may obtain connection information about the second external electronic device 1520 and transfer the message via the access point 1501 to the second external electronic device 1520 based on the connection information.

Figure 16:
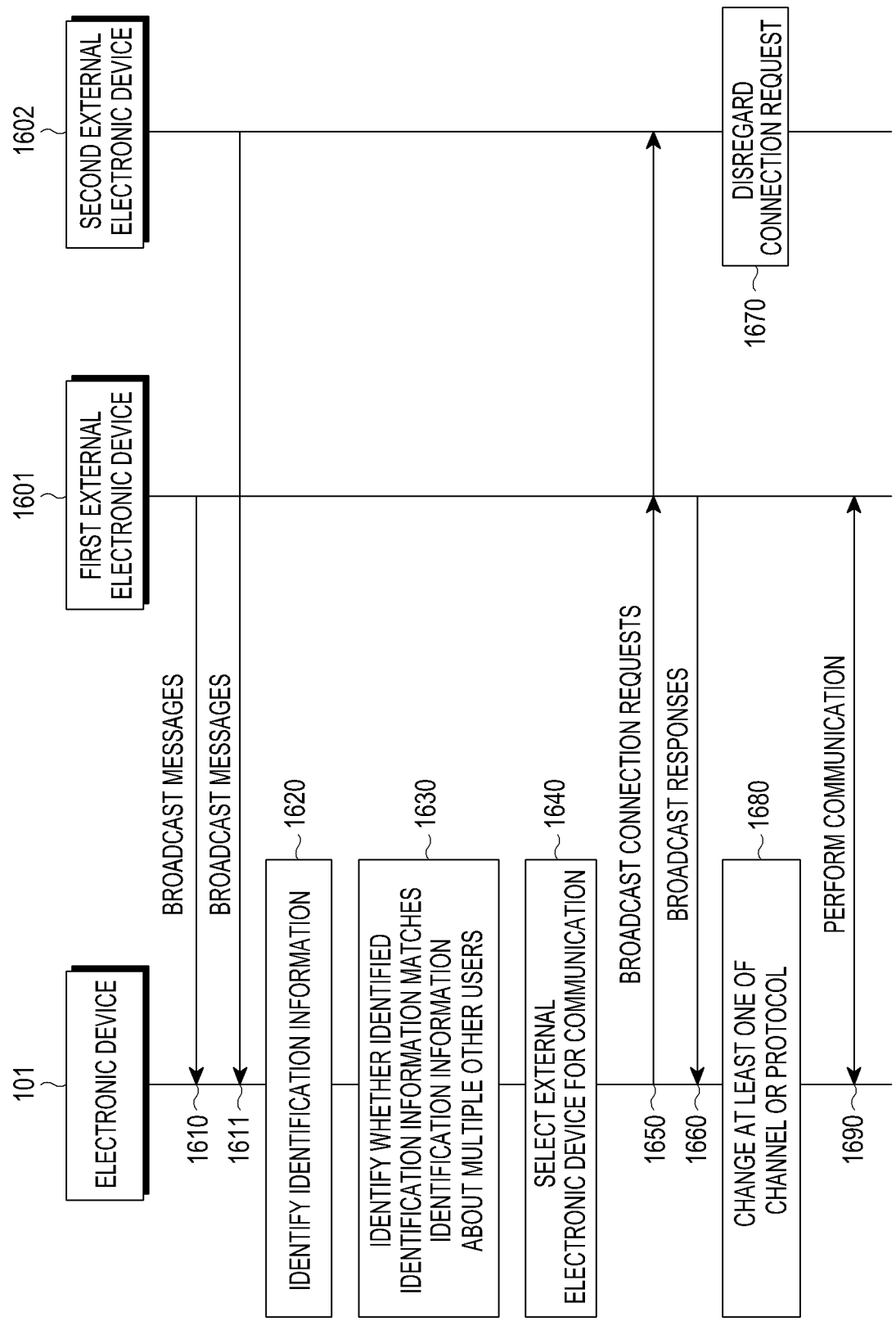
FIG. 16 is a flowchart illustrating a method for communicating, by an electronic device, with an external electronic device, according to an embodiment.

FIG. 16 is a flowchart illustrating a method for communicating, by an electronic device, with an external electronic device, according to an embodiment.

In steps 1610 and 1611, a first external electronic device 1601 and a second external electronic device 1602 may broadcast messages using a first protocol (e.g., WSMP). For example, the first external electronic device 1601 and the second external electronic device 1602 may broadcast V2X-related ,standard-based messages using the first protocol.

In step 1620, the processor 120 of the electronic device 101 may identify identification information corresponding to the first external electronic device 1601 and the second external electronic device 1602 contained in messages received from the first external electronic device 1601 and the second external electronic device 1602.

In step 1630, the processor may identify whether the identified identification information corresponding to the first external electronic device 1601 and the second external electronic device 1602 match identification information about a plurality of other users stored in the memory 130 of the electronic device 101. In another example, the processor may identify whether the identified identification information corresponding to the first external electronic device 1601 and the second external electronic device 1602 match identification information about a plurality of other users associated with the user of the electronic device 101, through an external server managing information about cars. It is assumed below for illustration purposes that the identification information corresponding to the first external electronic device 1601 matches the identification information about the plurality of other users.

In step 1640, the processor may select the first external electronic device 1601 as the external electronic device for communication. For example, since the identification information corresponding to the first external electronic device 1601 matches the identification information about the plurality of other users, the processor may select the first external electronic device 1601 as the external electronic device for communication.

In step 1650, the processor may broadcast connection requests containing the identification information corresponding to the first external electronic device 1601 to the first external electronic device 1601 through the communication module 190 (e.g., a communication circuit) of the electronic device 101.

In step 1660, the first external electronic device 1601 may broadcast or send responses to the electronic device 101 corresponding to the received connection request. For example, since the connection request contains the identification information corresponding to the first external electronic device 1601, the first external electronic device 1601 may identify that the connection request was intended to be sent to the first external electronic device 1601. When the user of the first external electronic device 1601 determines that the first external electronic device 1601 is to communicate with the electronic device 101, the first external electronic device 1601 may broadcast or send responses including the connection information about the first external electronic device 1601 to the electronic device 101.

In step 1670, the second external electronic device 1602 may disregard the connection request. For example, the second external electronic device 1602 may identify whether the connection request was intended for the second external electronic device 1602 based on the identification information contained in the connection request. Further, since the connection request contains the identification information corresponding to the first external electronic device 1601, the second external electronic device 1602 may identify that the connection request was not intended for the second external electronic device 1602. Upon identifying that the connection request was not intended for the second external electronic device 1602, the second external electronic device 1602 may disregard the connection request.

In step 1680, upon receipt of the response from the first external electronic device 1601, the processor may change at least one of the channel or protocol used for communication.

In step 1690, the processor may perform communication with the first external electronic device 1601 using the at least one channel or protocol that was changed.

Figure 17:
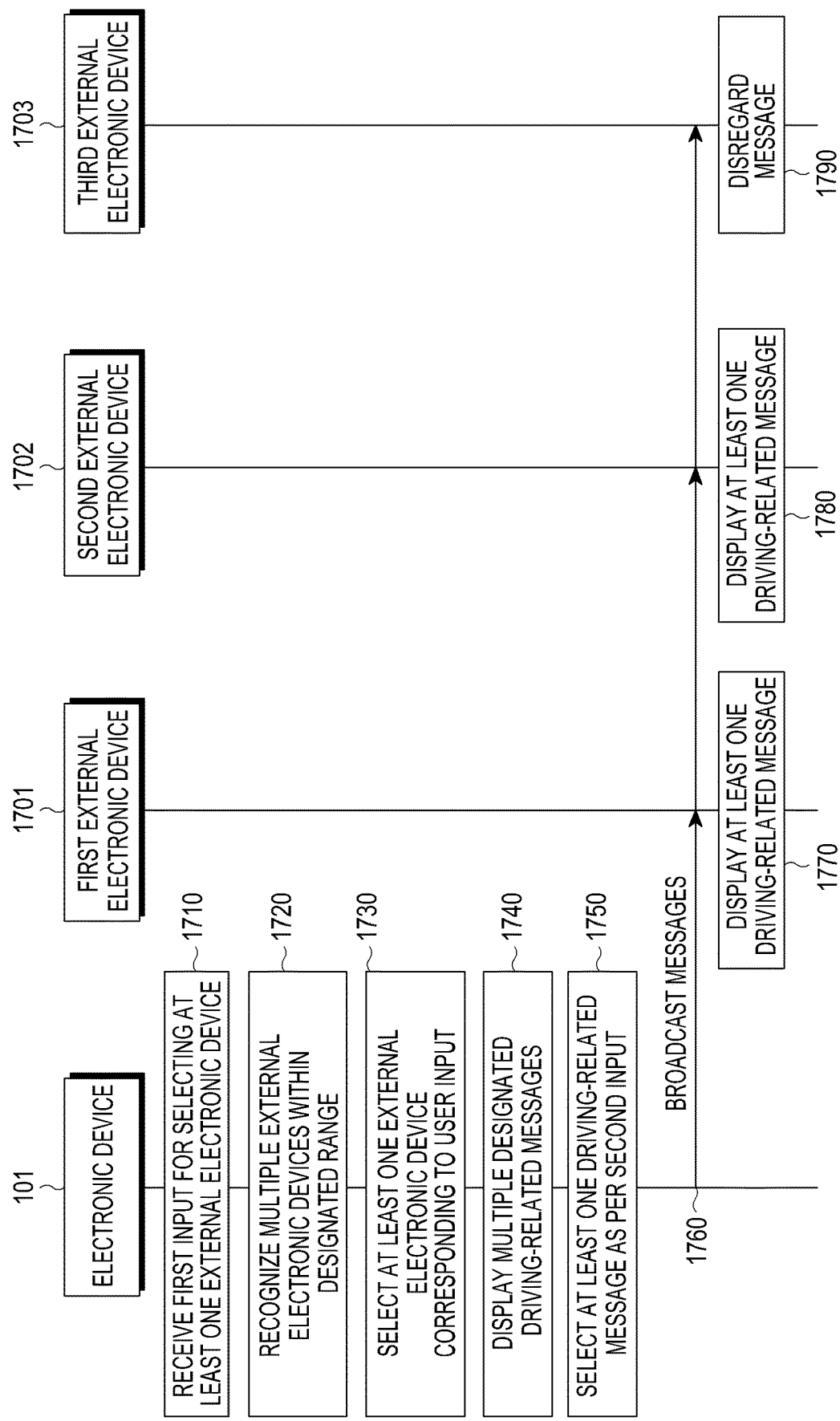
FIG. 17 is a flowchart illustrating a method for transmitting, by an electronic device, messages to at least one external electronic device, according to an embodiment.

FIG. 17 is a flowchart illustrating a method for transmitting, by an electronic device, messages to at least one external electronic device, according to an embodiment.

In step 1710, the processor 120 of the electronic device 101 may receive a first input for selecting at least one external electronic device through the input device 150.

In step 1720, in response to the first input, the processor may recognize a first external electronic device 1701, a second external electronic device 1702, and a third external electronic device 1703 that are within a designated range, using various pieces of information obtained through the sensor module 176 or an image obtained through the camera module 180 of the electronic device 101.

In step 1730, the processor may select at least one external electronic device corresponding to the first input from among the recognized first external electronic device 1701, second external electronic device 1702, and third external electronic device 1703. It is assumed below for illustration purposes that the first external electronic device 1701 and the second external electronic device 1702 are selected by the first input.

In step 1740, the processor may display, through the display device 160 of the electronic device 101, a plurality of designated driving-related messages. For example, the plurality of driving-related messages may be stored in the memory 130 of the electronic device 101.

In step 1750, the processor may select at least one driving-related message in accordance with a user input from among the plurality of driving-related messages. How to select the at least one driving-related message is the same as the method described above in connection with FIG. 13.

In step 1760, the processor may broadcast, through the communication module 190 (e.g., a communication circuit) of the electronic device, messages containing the at least one selected driving-related message and information corresponding to the first external electronic device 1701 and the second external electronic device 1702.

For example, the processor may obtain the identification information corresponding to the first external electronic device 1701 and second external electronic device 1702 from the memory. The processor may also obtain external server managing identification information about the plurality of external electronic devices. In another example, the processor may obtain the identification information corresponding to the first external electronic device 1701 and second external electronic device 1702 through the camera or sensor.

In steps 1770 and 1780, the first external electronic device 1701 and the second external electronic device 1702 may output, through the display or speaker, the at least one driving-related message contained in the messages. The first external electronic device 1701 and the second external electronic device 1702 may identify whether the messages were intended to be sent to the first external electronic device 1701 and the second external electronic device 1702 based on the identification information contained in the messages. The first external electronic device 1701 and the second external electronic device 1702, upon identifying that the messages were intended for the first external electronic device 1701 and the second external electronic device 1702, may output the at least one driving-related message through the display or speaker.

In step 1790, the third external electronic device 1703 may disregard the message. For example, the third external electronic device 1703 may identify whether the message was intended for the third external electronic device 1703 based on the identification information contained in the message. Upon identifying that the message was not intended for the third external electronic device 1703, the third external electronic device 1703 may disregard the message.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to one of those described above.

It should be appreciated that various embodiments of the present disclosure and the terms used therein are not intended to limit the technological features set forth herein to particular embodiments and that various changes, equivalents, and/or replacements therefor also fall within the scope of the present disclosure. With regard to the description of the drawings, similar reference numerals may be used to refer to similar or related elements. It is to be understood that the singular forms of the terms "a," "an," and "the" include plural references unless the context clearly dictates otherwise. As used herein, the terms "A or B," "at least one of A and B," "at least one of A or B," "A, B, or C," "at least one of A, B, and C," or "at least one of A, B, or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being operatively or communicatively "coupled with," "coupled to," "connected with" or "connected to" another element (e.g., a second element), it can be coupled or connected with/to the other element directly (e.g., wiredly), wirelessly, or via a third element.

As used herein, the term "module" may include a unit configured in hardware, software, or firmware and may interchangeably be used with other terms, for example, "logic," "logic block," "part," or "circuit." A module may be a single integral component, a minimum unit or part thereof, adapted to perform one or more functions. For example, the module may be configured of an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke an instruction stored in the storage medium and execute it, with or without using one or more other components under the control of the processor 120. The machine may include the electronic device 101 according to embodiments disclosed herein. When a command is executed by the processor 120, the processor 120 may perform a function corresponding to the command on its own or using other components under the control of the processor 120. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) of the above-described components may include a single entity or multiple entities, and the various embodiments may exclude some of the above-described sub components or add other sub components. Alternatively or additionally, a plurality of components (e.g., modules or programs) may be integrated into a single entity that may then perform the respective (prior to being integrated) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments of the present disclosure, the electronic device may change protocols or channels for communication to communicate with a particular external electronic device. Thus, the electronic device may prevent a waste of resources in performing communication with a particular external electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a display;
   a communication circuit; and
   a processor electrically connected with the communication circuit, wherein the processor is configured to:
   receive, through the communication circuit using a first protocol a plurality of messages from a plurality of external electronic devices, wherein each of the plurality of messages includes identification information on a respective external electronic device,
   identify at least one or more external electronic devices based on a plurality of identification information included in the plurality of messages, wherein the identification information indicates a relationship between the electronic device and the one or more external electronic devices,
   control the display to display the identified one or more external electronic devices among the plurality of external electronic devices
   receive a touch input for selecting an external electronic device among the displayed one or more external electronic devices,
   based on receiving the touch input, broadcast, through the communication circuit using the first protocol through a first channel, a connection request for a communication based on a second protocol with the selected external electronic device, wherein the connection request includes identification information on the selected external electronic device, and information about a second channel to be used in the communication using the second protocol,
   based on broadcasting, the connection request using the first protocol, receive a response to the connection request from the selected external electronic device through the communication circuit, and
   perform communication with the selected external electronic device through the communication circuit using the second protocol, through the second channel, based on connection information about the selected external electronic device,
   wherein the connection information is included in the response,
   and wherein the performance of the communication with the selected external electronic device comprises transmitting at least one driving related message.

2. The electronic device of claim 1, wherein the processor is further configured to:
   identify a plurality of pieces of identification information included in the plurality of messages.

3. The electronic device of claim 2, further comprising:
   a memory configured to store identification information about a plurality of other users, wherein the processor is further configured to:
   identify one or more pieces of identification information matching the stored identification information about the plurality of other users among the identified plurality of pieces of identification information, and
   identify the one or more external electronic devices corresponding to the one or more pieces of identification information, among the plurality of external electronic devices.

4. The electronic device of claim 3, wherein the processor is further configured to:
   identify a location of each of the one or more external electronic devices, and
   display, through the display, one or more graphical objects corresponding to the at least one or more external electronic devices respectively, based on the identified location of each of the one or more external electronic devices.

5. The electronic device of claim 2, wherein the processor is further configured to:
   identify one or more pieces of identification information matching identification information about a plurality of other users associated with a user of the electronic device through another external electronic device among the identified plurality of pieces of identification information, and
   identify the one or more external electronic devices corresponding to the one or more pieces of identification information, among the plurality of external electronic device.

6. The electronic device of claim 1, wherein the connection request further includes location information corresponding to the electronic device.

7. The electronic device of claim 1 wherein the processor is further configured to:
   based on receiving the response, change a channel for performing the communication through the communication circuit from the first channel to the second channel,
   change a protocol to be used in the communication through the communication circuit from the first protocol to the second protocol, and
   perform the communication with the selected external electronic device using the second protocol through the second channel.

8. The electronic device of claim 1, wherein the response includes the identification information on the selected electronic device and is broadcast from the selected external electronic device using the first protocol.

9. The electronic device of claim 1, wherein the connection request includes connection information about the electronic device for the communication using the second protocol, and
   wherein the response is sent from the selected external electronic device using the second protocol based on the connection information about the electronic device.

10. The electronic device of claim 1, further comprising a sensor, wherein the processor is configured to:
    identify the plurality of external electronic devices based on data obtained through the sensor.

11. An electronic device, comprising:
    a display;
    a communication circuit; and a processor electrically connected with the communication circuit, wherein the processor is configured to:
receive, through the communication circuit, through a first channel, a plurality of messages from a plurality of external electronic devices, wherein each of the plurality of messages includes identification information on a respective external electronic device,
identify one or more external electronic devices based on a plurality of identification information included in the plurality of messages, wherein the identification information indicates a relationship between the electronic device and the at least one or more external electronic devices,
control the display to display the identified one or more external electronic devices among the plurality of external electronic devices,
receive a touch input for selecting an external electronic device among the displayed one or more external electronic devices,
based on receiving the touch input broadcast, using the communication circuit, using a first protocol through a first channel, a connection request for a communication based on a second channel with the selected external electronic device, wherein the connection request includes information about a second channel for communication using the second protocol with the selected external electronic device and identification information on the selected external electronic device,
based on broadcasting, the connection request through the first channel, receive a response to the connection request from the selected external electronic device through the communication circuit, and
perform the communication with the selected external electronic device through the communication circuit, using the second protocol through the second channel, based on connection information about the selected external electronic device,
wherein the connection information is included in the response, and
wherein the performing of the communication with the selected external electronic device comprises transmitting at least one driving related message.

12. The electronic device of claim 11, wherein the processor is further configured to:
based on receiving the response, change a channel for performing the communication through the communication circuit from the first channel to the second channel,
change a protocol to be used in the communication through the communication circuit from the first protocol to the second protocol, and
perform the communication with the selected external electronic device using the second protocol through the second channel.

13. The electronic device of claim 11, wherein the response includes the identification information on the selected electronic device and is broadcast from the selected external electronic device using the first protocol.

14. The electronic device of claim 11, wherein the connection request includes connection information about the electronic device for the communication using the second protocol, and
wherein the response is sent from the selected external electronic device using the second protocol based on the connection information about the electronic device.

15. An electronic device, comprising:
a display;
a communication circuit; and
a processor electrically connected with the communication circuit, wherein the processor is configured to:
receive, through the communication circuit, a plurality of messages from a plurality of external electronic devices, wherein each of the plurality of messages includes identification information on a respective external electronic device,
identify at least one or more external electronic devices based on a plurality of identification information included in the received plurality of messages, wherein the identification information indicates a relationship between the electronic device and the at least one or more external electronic devices,
control the display to display the identified one or more external electronic devices among the plurality of external electronic devices based on the identification information,
receive a first touch input for selecting an external electronic device among the displayed one or more external electronic device,
display, through the display, a plurality of designated driving related messages,
receive a second touch input for selecting a driving-related message, from among the displayed plurality of designated driving-related messages,
based on receiving the first touch input, broadcast through the communication circuit, a connection request including connection information indicating a channel and a protocol to be used to perform communications,
based on broadcasting the connection request, receive a response to the connection based request from the selected external electronic device, and
based on receiving the second touch input and the response from the selected external electronic device, broadcast, through the communication circuit, through the channel and using the protocol indicated in the connection request a message including identification information about the selected external electronic device and the selected driving-related message.

16. The electronic device of claim 15, further comprising a camera, wherein the processor is further configured to:
identify the plurality of external electronic devices from an image obtained through the camera.

* * * * *